(12) United States Patent
Loehr et al.

(10) Patent No.: US 10,123,201 B2
(45) Date of Patent: Nov. 6, 2018

(54) RESOURCE ALLOCATION FOR D2D DISCOVERY TRANSMISSION

(71) Applicant: Sun Patent Trust, New York, NY (US)

(72) Inventors: Joachim Loehr, Wiesbaden (DE); Prateek Basu Mallick, Langen (DE)

(73) Assignee: Sun Patent Trust, New York, NY (US)

( * ) Notice: Subject to any disclaimer, the term of this patent is extended or adjusted under 35 U.S.C. 154(b) by 59 days.

(21) Appl. No.: 15/308,331

(22) PCT Filed: Feb. 25, 2015

(86) PCT No.: PCT/EP2015/053927
§ 371 (c)(1),
(2) Date: Nov. 1, 2016

(87) PCT Pub. No.: WO2015/169464
PCT Pub. Date: Nov. 12, 2015

(65) Prior Publication Data
US 2017/0064534 A1 Mar. 2, 2017

(30) Foreign Application Priority Data
May 9, 2014 (EP) .................................. 14167785

(51) Int. Cl.
*H04W 4/00* (2018.01)
*H04W 8/00* (2009.01)
(Continued)

(52) U.S. Cl.
CPC ............. *H04W 8/005* (2013.01); *H04L 67/16* (2013.01); *H04W 72/04* (2013.01);
(Continued)

(58) Field of Classification Search
CPC .............. H04L 5/0057; H04L 5/0051; H04W 72/0446; H04W 72/042; H04W 72/0413; H04W 76/048
See application file for complete search history.

(56) References Cited

U.S. PATENT DOCUMENTS

| 2014/0044024 A1 | 2/2014 | Zou et al. |
| 2014/0056220 A1* | 2/2014 | Poitau .................. H04W 76/14 370/328 |
| 2016/0278121 A1* | 9/2016 | Agiwal ................ H04W 8/005 |

FOREIGN PATENT DOCUMENTS

GB 2499418 A 8/2013

OTHER PUBLICATIONS

3GPP TS 23.303 V12.0.0, "$3^{rd}$ Generation Partnership Project; Technical Specification Group Services and System Aspects; Proximity-based services (ProSe); Stage 2 (Release 12)," Feb. 2014, 53 pages.
(Continued)

*Primary Examiner* — Afshawn M Towfighi
(74) *Attorney, Agent, or Firm* — Seed IP Law Group LLP

(57) ABSTRACT

The present invention relates to transmitting user equipment for transmitting data to a receiving user equipment over a direct link connection in a communication system. The transmitting user equipment is adapted to request resources for discovery transmission in the communication system and comprises a generating unit configured to generate a resource request message for allocation of resources for discovery transmission. The resource request message includes information on the amount of data to be transmitted and on discovery indication. The transmitting user equipment may further include a transmitting unit configured to transmit to a base station the generated resource request message, and a receiving unit adapted to receive from the
(Continued)

base station a resource configuration message allocating the requested resources for discovery transmission.

16 Claims, 12 Drawing Sheets

(51) Int. Cl.
*H04W 72/04* (2009.01)
*H04L 29/08* (2006.01)
*H04W 72/12* (2009.01)
*H04W 76/14* (2018.01)

(52) U.S. Cl.
CPC ... *H04W 72/0413* (2013.01); *H04W 72/1268* (2013.01); *H04W 76/14* (2018.02)

(56) References Cited

OTHER PUBLICATIONS

3GPP TR 25.912 V11.0.0, "3$^{rd}$ Generation Partnership Project; Technical Specification Group Radio Access Network; Feasibility study for evolved Universal Terrestrial Radio Access (UTRAN) and Universal Terrestrial Radio Access Network (UTRA) (Release 11)," Sep. 2012, 64 pages.
3GPP TR 25.913 V9.0.0, "3$^{rd}$ Generation Partnership Project; Technical Specification Group Radio Access Network; Requirements for Evolved UTRA (E-UTRA) and Evolved UTRAN (E-UTRAN) (Release 9)," Dec. 2009, 18 pages.
3GPP TS 36.101 V12.0.0, "3$^{rd}$ Generation Partnership Project; Technical Specification Group Radio Access Network; Evolved Universal Terrestrial Radio Access (E-UTRA); User Equipment (UE) radio transmission and reception (Release 12)," Jul. 2013, 450 pages.
3GPP TS 36.211 V8.9.0, "3$^{rd}$ Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.211 V9.0.0, "3$^{rd}$ Generation Partnership Project; Technical Specification Group Radio Access Network; Evolved Universal Terrestrial Radio Access (E-UTRA); Physical Channels and Modulation (Release 9)," Dec. 2009, 85 pages.
3GPP TS 36.212 V12.0.0, "3$^{rd}$ Generation Partnership Project; Technical Specification Group Radio Access Network; Evolved Universal Terrestrial Radio Access (E-UTRA); Multiplexing and channel coding (Release 12)," Dec. 2013, 88 pages.
3GPP TS 36.213 V12.1.0, "3$^{rd}$ Generation Partnership Project; Technical Specification Group Radio Access Network; Evolved Universal Terrestrial Radio Access (E-UTRA); Physical layer procedures (Release 12)," Mar. 2014, 186 pages.
3GPP TS 36.321 V8.0.0, "3$^{rd}$ Generation Partnership Project; Technical Specification Group Radio Access Network; Evolved Universal Terrestrial Radio Access (E-UTRA) Medium Access Control (MAC) protocol specification (Release 8)," Dec. 2007, 23 pages.
3GPP TS 36.321 V10.5.0, "3$^{rd}$ Generation Partnership Project; Technical Specification Group Radio Access Network; Evolved Universal Terrestrial Radio Access (E-UTRA) Medium Access Control (MAC) protocol specification (Release 10)," Mar. 2012, 54 pages.
3GPP TR 36.843 V12.0.0, "3$^{rd}$ Generation Partnership Project; Technical Specification Group Radio Access Network; Study on LTE device to device proximity services; Radio aspects (Release 12)," Mar. 2014, 49 pages.
Ericsson, "Overview of D2D Scheduling," Tdoc R2-140626, 3GPP TSG-RAN WG2 #85, Agenda Item: 7.5.3, Prague, Czech Republic, Feb. 10-14, 2014, 5 pages.
Extended European Search Report dated Nov. 19, 2014, for corresponding EP Application No. 14167785.6-1505, 8 pages.
International Search Report dated Jun. 1, 2015, for corresponding International Application No. PCT/EP2015/053927, 3 pages.

\* cited by examiner

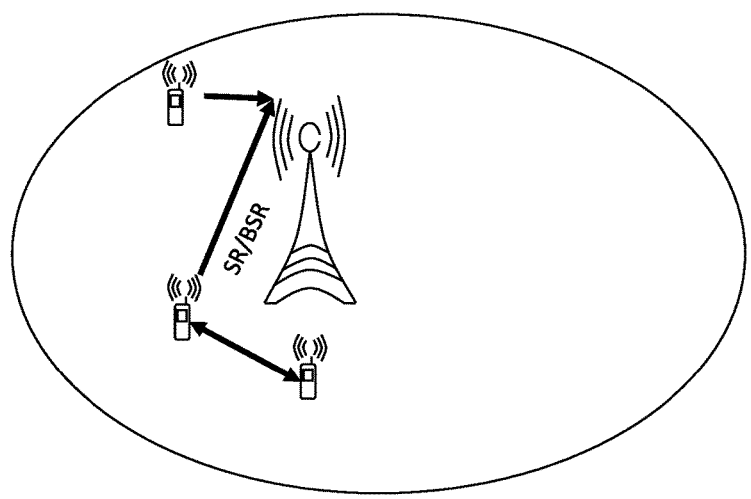
Fig. 9
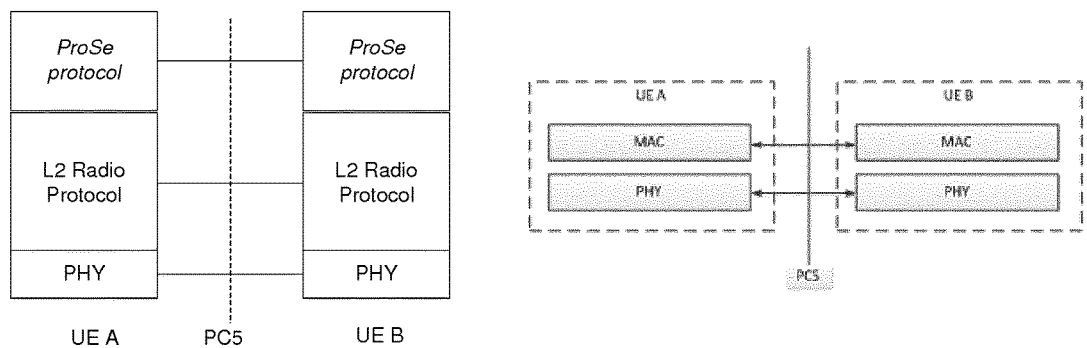
Fig. 10
Fig. 11

RESOURCE ALLOCATION FOR D2D DISCOVERY TRANSMISSION

FIELD OF THE INVENTION

The present invention relates to an apparatus and method for performing resource allocation of transmission of discovery information in a device-to-device communication system. In particular, the present invention also relates to a user equipment capable of operating in a device-to-device communication system and capable of performing the method of the invention.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. The detailed system requirements are given in 3GPP, TR 25.913 ("Requirements for Evolved UTRA and Evolved UTRAN", www.3gpp.org). In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed, including multiple-input multiple-output (MIMO) channel transmission techniques, and a highly efficient control signaling structure is achieved in Rel. 8 LTE.

E-UTRAN Architecture

The overall architecture is shown in FIG. 1, and a more detailed representation of the E-UTRAN architecture is given in FIG. 2. The E-UTRAN consists of one or more eNodeBs, providing the E-UTRA user plane (PDCP/RLC/MAC/PHY) and control plane (RRC) protocol terminations towards the UE. The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (UL QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNodeBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the S-GW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the S-GW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the UE to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a given number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g., to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (CCs) are aggregated in order to support wider transmission bandwidths up to 100 MHz. Several cells in the LTE system are aggregated into one wider channel in the LTE-Advanced system which is wide enough for 100 MHz, even though these cells in LTE are in different frequency bands. A UE may simultaneously receive or transmit on one or multiple CCs depending on its capabilities:

A Rel-10 UE with reception and/or transmission capabilities for CA can simultaneously receive and/or transmit on multiple CCs corresponding to multiple serving cells;

A Rel-8/9 UE can receive on a single CC and transmit on a single CC corresponding to one serving cell only.

Carrier aggregation (CA) is supported for both contiguous and non-contiguous CCs with each CC limited to a maximum of 110 Resource Blocks in the frequency domain using the Rel-8/9 numerology.

It is possible to configure a UE to aggregate a different number of CCs originating from the same eNB and of possibly different bandwidths in the UL and the DL.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not provide the same coverage.

Component carriers shall be LTE Rel-8/9 compatible. Nevertheless, existing mechanisms (e.g., barring) may be used to avoid Rel-8/9 UEs to camp on a component carrier.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively. The transport channels are described between MAC and Layer 1, the logical channels are described between MAC and RLC.

When carrier aggregation (CA) is configured, the UE only has one RRC connection with the network. At RRC connection establishment/re-establishment/handover, one serving cell provides the NAS mobility information (e.g., TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC), while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC), while in the uplink it is an Uplink Secondary Component Carrier (UL SCC).

The configured set of serving cells for a UE therefore always consists of one PCell and one or more SCells:

For each SCell the usage of uplink resources by the UE in addition to the downlink ones is configurable (the number of DL SCCs configured is therefore always larger or equal to the number of UL SCCs and no SCell can be configured for usage of uplink resources only);

From a UE viewpoint, each uplink resource only belongs to one serving cell;

The number of serving cells that can be configured depends on the aggregation capability of the UE;

PCell can only be changed with handover procedure (i.e., with security key change and RACH procedure);

PCell is used for transmission of PUCCH;

Unlike SCells, PCell cannot be de-activated;

Re-establishment is triggered when the PCell experiences Rayleigh fading (RLF), not when SCells experience RLF;

Non-access stratum (NAS) information is taken from the downlink PCell.

The configuration and reconfiguration of component carriers can be performed by RRC. Activation and deactivation is done via MAC control elements. At intra-LTE handover, RRC can also add, remove, or reconfigure SCells for usage in the target cell. The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell, i.e., while in connected mode, UEs need not acquire broadcasted system information directly from the SCells.

When a user equipment is configured with carrier aggregation there is one pair of uplink and downlink component carriers that is always active. The downlink component carrier of that pair might be also referred to as "DL anchor carrier". Same applies also for the uplink.

When carrier aggregation is configured, a user equipment may be scheduled over multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE RRC States

The following is mainly describing the two main states in LTE: "RRC_IDLE" and "RRC_CONNECTED".

In RRC_IDLE the radio is not active, but an ID is assigned and tracked by the network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e., whether a cell is barred or reserved). An RRC_IDLE mobile terminal monitors a paging channel to detect incoming calls, and also acquires system information. The system information mainly consists of parameters by which the network (E-UTRAN) can control the cell (re) selection process. RRC specifies the control signalling applicable for a mobile terminal in RRC_IDLE, namely paging and system information. The mobile terminal behavior in RRC_IDLE is specified in TR 25.912, e.g., Chapter 8.4.2 incorporate herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighboring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behavior in RRC_CONNECTED.

Logical and Transport Channels

The MAC layer provides a data transfer service for the RLC layer through logical channels. Logical channels are either Control Logical Channels which carry control data such as RRC signalling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length is a multiple of the subframes. The TTI length may be fixed in a service area for all users, may be different for different users, or may even be dynamic for each user. Generally, the L1/L2 control signaling needs only be transmitted once per TTI.

The L1/L2 control signalling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:

A user identity indicating the user(s) that is/are allocated the resources.

RB allocation information for indicating the resources (Resource Blocks (RBs)) on which a user(s) is/are allocated. The number of allocated resource blocks can be dynamic.

The duration of assignment (optional), if an assignment over multiple subframes (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:

Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)

Cat 3 information: HARQ related information, e.g., hybrid ARQ process number, redundancy version, retransmission sequence number Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference).

Format 0: DCI Format 0 is used for the transmission of resource grants for the PUSCH.

For further information regarding the DCI formats and the particular information that is transmitted in the DCI, please refer to the technical standard or to LTE—The UMTS Long Term Evolution—From Theory to Practice, Edited by Stefania Sesia, Issam Toufik, Matthew Baker, Chapter 9.3, incorporated herein by reference.

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:

The physical resource(s) on which the data is transmitted (e.g., subcarriers or subcarrier blocks in case of OFDM, codes in case of CDMA). This information allows the mobile terminal (receiver) to identify the resources on which the data is transmitted.

When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e., the cross-scheduled component carrier does not carry any L1/L2 control signaling.

The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:

HARQ process number: Allows the user equipment to identify the hybrid ARQ process on which the data is mapped.

Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.

Redundancy and/or constellation version: Tells the user equipment, which hybrid ARQ redundancy version is used (required for de-rate-matching) and/or which modulation constellation version is used (required for demodulation).

UE Identity (UE ID): Tells for which user equipment the L1/L2 control signaling is intended. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g., subcarriers or subcarrier blocks in case of OFDM, codes in case of CDMA).

When user equipment is configured to have a Carrier Indication Field (CIF) in the L1/L2 control signaling, this information identifies the component carrier for which the specific control signaling information is intended. This enables assignments to be sent on one component carrier which are intended for another component carrier. This other, cross-scheduled component carrier may be for example a PDCCH-less component carrier, i.e., the cross-scheduled component carrier does not carry any L1/L2 control signaling.

L1/L2 control signaling for uplink grants is sent on the DL component carrier that is linked with the uplink component carrier or on one of the several DL component carriers, if several DL component carriers link to the same UL component carrier.

The Transport Format, the user equipment that should be used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
  HARQ Process number: Tells the user equipment from which hybrid ARQ process it should pick the data.
  Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
  Redundancy and/or constellation version: Tells the user equipment which hybrid ARQ redundancy version to use (required for rate-matching) and/or which modulation constellation version to use (required for modulation).
  UE Identity (UE ID): Tells which user equipment should transmit data. In typical implementations this information is used to mask the CRC of the L1/L2 control signaling in order to prevent other user equipments to read this information.

There are several different possibilities of how to exactly transmit the information pieces mentioned above in uplink and downlink data transmission. Moreover, in uplink and downlink, the L1/L2 control information may also contain additional information or may omit some of the information. For example:
  HARQ process number may not be needed, i.e., is not signaled, in case of a synchronous HARQ protocol.
  A redundancy and/or constellation version may not be needed, and thus not signaled, if Chase Combining is used (always the same redundancy and/or constellation version) or if the sequence of redundancy and/or constellation versions is pre-defined.
  Power control information may be additionally included in the control signaling.
  MIMO related control information, such as, e.g., precoding, may be additionally included in the control signaling.
  In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e., the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries, modulation order and Transport block size info are signaled.

Uplink Access Scheme for LTE

For Uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g., a subframe of 0.5 ms, onto which coded information bits are mapped. It should be noted that a subframe, also referred to as transmission time interval (TTI), is the smallest time interval for user data transmission. It is however possible to assign a frequency resource $BW_{grant}$ over a longer time period than one TTI to a user by concatenation of subframes.

Uplink Scheduling Scheme for LTE

The uplink scheme allows for both scheduled access, i.e., controlled by eNB, and contention-based access.

In case of scheduled access, the UE is allocated a certain frequency resource for a certain time (i.e., a time/frequency resource) for uplink data transmission. However, some time/frequency resources can be allocated for contention-based access; within these time/frequency resources, UEs can transmit without first being scheduled. One scenario where UE is making a contention-based access is for example the random access, i.e., when UE is performing initial access to a cell or for requesting uplink resources.

For the scheduled access the Node B scheduler assigns a user a unique frequency/time resource for uplink data transmission. More specifically the scheduler determines which UE(s) that is (are) allowed to transmit,
which physical channel resources (frequency),
Transport format (Modulation Coding Scheme (MCS)) to be used by the mobile terminal for transmission.

The allocation information is signaled to the UE via a scheduling grant, sent on the L1/L2 control channel. For simplicity reasons this channel may be called uplink grant channel in the following. A scheduling grant message contains at least information which part of the frequency band the UE is allowed to use, the validity period of the grant and the transport format the UE has to use for the upcoming uplink transmission. The shortest validity period is one subframe. Additional information may also be included in the grant message, depending on the selected scheme. Only "per UE" grants are used to grant the right to transmit on the UL-SCH (i.e., there are no "per UE per RB" grants). Therefore, the UE needs to distribute the allocated resources among the radio bearers according to some rules. Unlike in HSUPA there is no UE-based transport format selection. The eNB decides the transport format based on some information, e.g., reported scheduling information and QoS info, and UE has to follow the selected transport format. In HSUPA the Node B assigns the maximum uplink resource, and the UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.

Starvation of low priority services should be avoided;
Clear QoS differentiation for radio bearers/services should be supported by the scheduling scheme;
The UL reporting should allow fine granular buffer status reports (e.g., per radio bearer or per radio bearer group) in order to allow the eNB scheduler to identify for which Radio Bearer/service data is to be sent;
It should be possible to make clear QoS differentiation between services of different users;
It should be possible to provide a minimum bit rate per radio bearer.

As can be seen from the above list, one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signalled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Buffer Status Reporting/Scheduling Request Procedure for Uplink Scheduling

The usual mode of scheduling is dynamic scheduling, by means of downlink assignment messages for the allocation of downlink transmission resources and uplink grant messages for the allocation of uplink transmission resources; these are usually valid for specific single subframes. They are transmitted on the PDCCH using C-RNTI of the UE as already mentioned before. Dynamic scheduling is efficient for services types, in which the traffic is bursty and dynamic in rate, such as TCP.

In addition to the dynamic scheduling, a persistent scheduling is defined, which enables radio resources to be semi-statically configured and allocated to a UE for a longer time period than one subframe, thus avoiding the need for specific downlink assignment messages or uplink grant messages over the PDCCH for each subframe. Persistent scheduling is useful for services such as VoIP for which the data packets are small, periodic and semi-static in size. Thus, the overhead of the PDCCH is significantly reduced compared to the case of dynamic scheduling.

Buffer status reports (BSR) from the UE to the eNodeB are used to assist the eNodeB in allocating uplink resources, i.e., uplink scheduling. For the downlink case, the eNB scheduler is obviously aware of the amount of data to be delivered to each UE; however, for the uplink direction, since scheduling decisions are done at the eNB and the buffer for the data is in the UE, BSRs have to be sent from the UE to the eNB in order to indicate the amount of data that needs to be transmitted over the UL-SCH.

There are basically two types of Buffer Status Report MAC control elements (BSR) defined for LTE: a long BSR (with four buffer size fields corresponding to LCG IDs #0-3) or a short BSR (with one LCG ID field and one corresponding buffer size field). The buffer size field indicates the total amount of data available across all logical channels of a logical channel group, and is indicated in number of bytes encoded as an index of different buffer size levels (see also 3GPP TS 36.321 v 10.5.0 Chapter 6.1.3.1, incorporated herewith by reference). In addition, there is a further type of Buffer Status Report, for use of truncated data, where the Buffer Status Report is 2 bytes long.

Which one of either the short or the long BSR is transmitted by the UE depends on the available transmission resources in a transport block, on how many groups of logical channels have non-empty buffers, and on whether a specific event is triggered at the UE. The long BSR reports the amount of data for four logical channel groups, whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

A BSR may be triggered, as an example, for the following events:
Whenever data arrives for a logical channel, which has a higher priority than the logical channels whose buffer are non-empty;
Whenever data becomes available for any logical channel, when there was previously no data available for transmission;
Whenever the retransmission BSR time expires;
Whenever periodic BSR reporting is due, i.e., periodic BSR timer expires;
Whenever there is a spare space in a transport block which can accommodate a BSR.

In order to be robust against transmission failures, there is a BSR retransmission mechanism defined for LTE; the retransmission BSR timer is started or restarted whenever an uplink grant is restarted. If no uplink grant is received before the retransmission BSR timer expires, another BSR is triggered by the UE.

If the UE has no uplink resources allocated for including a BSR in the transport block (TB) when a BSR is triggered the UE sends a scheduling request (SR) on the Physical Uplink Control Channel (PUCCH), if configured. For the case that there are no D-SR (dedicated Scheduling request) resources on PUCCH configured, the UE will start the Random Access Procedure (RACH procedure) in order to request UL-SCH resources for transmission the BSR info to eNB. However it should be noted that the UE will not trigger SR transmission for the case that a periodic BSR is to be transmitted.

Furthermore an enhancement to the SR transmission has been introduced for a specific scheduling mode where resources are persistently allocated with a defined periodicity in order to save L1/L2 control signalling overhead for transmission grants, which is referred to as semi-persistent scheduling (SPS). One example for a service, which has been mainly considered for semi-persistent scheduling, is VoIP. Every 20 ms a VoIP packet is generated at the Codec during a talk-spurt. Therefore eNB can allocate uplink or respectively downlink resource persistently every 20 ms, which could be then used for the transmission of VoIP packets. In general SPS is beneficial for services with predictable traffic behavior, i.e., constant bit rate, packet arrival time is periodic. For the case that SPS is configured for the uplink direction, the eNB can turn off SR triggering/transmission for certain configured logical channels, i.e., BSR triggering due to data arrival on those specific configured logical channels will not trigger an SR. The motivation for such kind of enhancements is that reporting an SR for those logical channels which will use the semi-persistently allocated resources (logical channels which carry VoIP packets) is of no value for eNB scheduling, and hence should be avoided.

More detailed information with regard to BSR and in particular the triggering of same is explained in 3GPP TS 36.321 V10.5 in Chapter 5.4.5 incorporated herewith by reference.

Logical Channel Prioritization

The UE has an uplink rate control function which manages the sharing of uplink resources between radio bearers. This uplink rate control function is also referred to as logical channel prioritization procedure in the following. The Logical Channel Prioritization (LCP) procedure is applied when a new transmission is performed, i.e., a Transport block needs to be generated. One proposal for assigning capacity has been to assign resources to each bearer, in priority order, until each has received an allocation equivalent to the minimum data rate for that bearer, after which any additional capacity is assigned to bearers in, for example, priority order.

As will become evident from the description of the LCP procedure given below, the implementation of the LCP procedure residing in the UE is based on the token bucket model, which is well known in the IP world. The basic functionality of this model is as follows. Periodically at a given rate, a token, which represents the right to transmit a quantity of data, is added to the bucket. When the UE is granted resources, it is allowed to transmit data up to the amount represented by the number of tokens in the bucket. When transmitting data the UE removes the number of tokens equivalent to the quantity of transmitted data. In case the bucket is full, any further tokens are discarded. For the addition of tokens it could be assumed that the period of the repetition of this process would be every TTI, but it could be easily lengthened such that a token is only added every second. Basically instead of every 1 ms a token is added to the bucket, 1000 tokens could be added every second. In the following, the logical channel prioritization procedure which is used in Rel-8 is described.

More detailed information with regard to the LCP procedure is explained in 3GPP TS 36.321 V8 in Chapter 5.4.3.1, incorporated herewith by reference.

RRC controls the scheduling of uplink data by signalling for each logical channel: priority where an increasing priority value indicates a lower priority level, prioritisedBitRate which sets the Prioritized Bit Rate (PBR), and bucketSizeDuration which sets the Bucket Size Duration (BSD). The idea behind prioritized bit rate is to support for each bearer, including low priority non-GBR bearers, a minimum bit rate in order to avoid a potential starvation. Each bearer should at least get enough resources in order to achieve the prioritized bit rate (PRB).

The UE shall maintain a variable $Bj$ for each logical channel j. $Bj$ shall be initialized to zero when the related logical channel is established, and incremented by the product PBR×TTI duration for each TTI, where PBR is Prioritized Bit Rate of logical channel j. However, the value of $Bj$ can never exceed the bucket size, and if the value of $Bj$ is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall allocate resources to the logical channels in the following steps:

Step 1: All the logical channels with $Bj>0$ are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE shall decrement $Bj$ by the total size of MAC SDUs served to logical channel j in Step 1;

It has to be noted at this point that the value of $Bj$ can be negative.

Step 3: if any resources remain, all the logical channels are served in a strict decreasing priority order (regardless of the value of $Bj$) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximize the transmission of data.

For the Logical Channel Prioritization procedure, the UE shall take into account the following relative priority in decreasing order:

MAC control element for C-RNTI or data from UL-CCCH;

MAC control element for BSR, with exception of BSR included for padding;

MAC control element for PHR;

data from any Logical Channel, except data from UL-CCCH;

MAC control element for BSR included for padding.

For the case of carrier aggregation, which is described in a later section, when the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when UE is requested to transmit multiple MAC PDUs in one TTI.

Uplink Power Control

Uplink transmission power control in a mobile communication system serves an important purpose: it balances the need for sufficient transmitted energy per bit to achieve the required Quality-of-Service (QoS), against the needs to minimize interference to other users of the system and to maximize the battery life of the mobile terminal. In achieving this purpose, the role of the Power Control (PC) becomes decisive to provide the required SINR, while controlling at the same time the interference caused to neighboring cells. The idea of classic PC schemes in uplink is that all users are received with the same SINR, which is known as full compensation. As an alternative, 3GPP has adopted for LTE the use of Fractional Power Control (FPC). This new functionality makes users with a higher path loss operate at a lower SINR requirement so that they will more likely generate less interference to neighboring cells.

Detailed power control formulae are specified in LTE for the Physical Uplink Shared Channel (PUSCH), Physical Uplink Control Channel (PUCCH) and the Sounding Reference Signals (SRSs) (section 5.1 in TS 36.213). The formula for each of these uplink signals follows the same basic principles; in all cases they can be considered as a summation of two main terms: a basic open-loop operating point derived from static or semi-static parameters signalled by the eNodeB, and a dynamic offset updated from subframe to subframe.

The basic open-loop operating point for the transmit power per resource block depends on a number of factors including the inter-cell interference and cell load. It can be further broken down into two components, a semi-static base level P0, further comprised of a common power level for all UEs in the cell (measured in dBm) and a UE-specific offset, and an open-loop path loss compensation component. The dynamic offset part of the power per resource block can also be further broken down into two components, a component dependent on the used MCS and explicit Transmitter Power Control (TPC) commands.

The MCS-dependent component (referred to in the LTE specifications as $\Delta_{TF}$, where TF stands for "Transport Format") allows the transmitted power per RB to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signalling—i.e., the mode cannot be changed dynamically. With the accumulative TPC commands, each TPC command signals a power step relative to the previous level.

Power Headroom Reporting

In order to assist the eNodeB to schedule the uplink transmission resources to different UEs in an appropriate way, it is important that the UE can report its available power headroom to eNodeB.

The eNodeB can use the power headroom reports to determine how much more uplink bandwidth per subframe a UE is capable of using. This helps to avoid allocating uplink transmission resources to UEs which are unable to use them, in order to avoid a waste of resources.

The range of the power headroom report is from +40 to −23 dB. The negative part of the range enables the UE to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in subframes in which a UE has an UL grant. The report relates to the subframe in which it is sent. A number of criteria are defined to trigger a power headroom report. These include:

A significant change in estimated path loss since the last power headroom report, More than a configured time has elapsed since the previous power headroom report, More than a configured number of closed-loop TPC commands have been implemented by the UE.

The eNodeB can configure parameters to control each of these triggers depending on the system loading and the requirements of its scheduling algorithm. To be more specific, RRC controls power headroom reporting by configuring the two timers periodicPHR-Timer and prohibitPHR-Timer, and by signalling dl-PathlossChange, which sets the change in measured downlink path loss to trigger a power headroom report.

The power headroom report is send as a MAC Control Element. It consists of a single octet where the two highest bits are reserved and the six lowest bits represent the dB values mentioned above in 1 dB steps. The structure of the MAC Control Element is shown in FIG. 7.

The UE power headroom PH valid for subframe i is defined by:

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\}[dB]$$

The power headroom shall be rounded to the closest value in the range [40; −23] dB with steps of 1 dB.

$P_{cmax}$, the maximum UE Transmission power (Tx power) is a value chosen by the UE in the given range of $P_{CMAX\_L}$ and $P_{CMAX\_H}$.

$$P_{CMAX\_L} \leq P_{CMAX} \leq P_{CMAX\_H}, \text{ where}$$

$$P_{CMAX\_L} = \text{MIN}\{P_{EMAX} - \Delta T_C, P_{PowerClass} - \text{MPR} - A\text{-MPR} - \Delta T_C\}, \text{ and}$$

$$P_{CMAX\_H} = \text{MIN}\{P_{EMAX}, P_{PowerClass}\};$$

and where $P_{EMAX}$ is the value signalled by the network.

MPR is a power reduction value used to control the adjacent channel leakage power ratio (ACLR) associated with the various modulation schemes and the transmission bandwidth.

A-MPR is the additional maximum power reduction. It is band-specific and it is applied when configured by the network. Therefore, $P_{cmax}$ is UE-implementation-specific and hence not known by eNB.

More detailed information with regard to $\Delta T_C$ is specified in 3GPP TS 36.101, Vers. 12.0.0, section 6.2.5, incorporated herein by reference.

LTE Device-to-Device (D2D) Proximity Services

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market, and will, at the same time, serve the urgent needs of several Public Safety communities that are jointly committed to LTE.

Device-to-Device (D2D) communication is a technology component for LTE-rel. 12. The Device-to-Device (D2D) communication technology allows D2D as an underlay to the cellular network to increase the spectral efficiency. For example, if the cellular network is LTE, all data carrying physical channels use SC-FDMA for D2D signalling. In D2D communication, user equipments (UEs) transmit data signals to each other over a direct link using the cellular resources instead of through the Base Station. A possible scenario in a D2D compatible communication system is shown in FIG. 9.

D2D Communication in LTE

The "D2D communication in LTE" is focusing on two areas: Discovery and Communication, whereas this invention is mostly related to the Discovery part.

Device-to-Device (D2D) communication is a technology component for LTE-A. In D2D communication, UEs transmit data signals to each other over a direct link using the cellular resources instead of through the BS. D2D users communicate directly while remaining controlled under the BS, i.e., at least when being in coverage of an eNB. Therefore D2D can improve system performances by reusing cellular resources.

It is assumed that D2D operates in uplink LTE spectrum (in the case of FDD) or uplink subframes of the cell giving coverage (in case of TDD except when out of coverage). Furthermore D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication when UE1 has a role of transmission (transmitting user equipment), UE1 sends data and UE2 (receiving user equipment) receives it. UE1 and UE2 can change their transmission and reception role. The transmission from UE1 can be received by one or more UEs like UE2.

With respect to the user plane protocols, in the following the content of the agreement from D2D communication perspective is reported (3GPP TR 36.843 vers. 12.0.0 section 9.2, incorporated herein by reference):

PDCP:
  1:M D2D broadcast communication data (i.e., IP packets) should be handled as the normal user-plane data.
  Header-compression/decompression in PDCP is applicable for 1:M D2D broadcast communication.
    U-Mode is used for header compression in PDCP for D2D broadcast operation for public safety.

RLC:
  RLC UM is used for 1:M D2D broadcast communication.
  Segmentation and Re-assembly is supported on L2 by RLC UM.
  A receiving UE needs to maintain at least one RLC UM entity per transmitting peer UE.
  An RLC UM receiver entity does not need to be configured prior to reception of the first RLC UM data unit.
  So far no need has been identified for RLC AM or RLC TM for D2D communication for user plane data transmission.

MAC:
  No HARQ feedback is assumed for 1:M D2D broadcast communication.
  The receiving UE needs to know a source ID in order to identify the receiver RLC UM entity.
  The MAC header comprises a L2 target ID which allows filtering out packets at MAC layer.
  The L2 target ID may be a broadcast, group cast or unicast address.
    L2 Groupcast/Unicast: A L2 target ID carried in the MAC header would allow discarding a received RLC UM PDU even before delivering it to the RLC receiver entity.
    L2 Broadcast: A receiving UE would process all received RLC PDUs from all transmitters and aim to re-assemble and deliver IP packets to upper layers.
  MAC subheader contains LCIDs (to differentiate multiple logical channels).
  At least Multiplexing/de-multiplexing, priority handling and padding are useful for D2D.

Resource Allocation

The resource allocation for D2D communication is under discussion and is described in its present form in 3GPP TR 36.843, version 12.0.0, section 9.2.3, incorporated herein by reference.

From the perspective of a transmitting UE, a UE can operate in two modes for resource allocation:
  Mode 1: eNodeB or Release-10 relay node schedules the exact resources used by a UE to transmit direct data and direct control information;
  Mode 2: a UE on its own selects resources from resource pools to transmit direct data and direct control information.

D2D communication capable UE shall support at least Mode 1 for in-coverage. D2D communication capable UE shall support Mode 2 for at least edge-of-coverage and/or out-of-coverage.

UEs in-coverage and out-of-coverage need to be aware of a resource pool (time/frequency) for D2D communication reception.

All UEs (Mode 1 ("scheduled") and Mode 2 ("autonomous")) are provided with a resource pool (time and frequency) in which they attempt to receive scheduling assignments.

In Mode 1, a UE requests transmission resources from an eNodeB. The eNodeB schedules transmission resources for transmission of scheduling assignment(s) and data.
  The UE sends a scheduling request (D-SR or RA) to the eNodeB followed by a BSR, based on which the eNodeB can determine that the UE intends to perform a D2D transmission as well as the required amount resources.

In Mode 1, the UE needs to be RRC Connected in order to transmit D2D communication.

For Mode 2, UEs are provided with a resource pool (time and frequency) from which they choose resources for transmitting D2D communication.

FIG. 8 schematically illustrates the Overlay (LTE) and the Underlay (D2D) transmission and/or reception resources. The eNodeB controls whether the UE may apply Mode 1 or Mode 2 transmission. Once the UE knows its resources where it can transmit (or receive) D2D communication, it uses the corresponding resources only for the corresponding transmission/reception. In the example of FIG. 8, the D2D subframes will only be used to receive or transmit the D2D signals. Since the UE as a D2D device would operate in Half Duplex mode, it can either receive or transmit the D2D signals at any point of time. Similarly, in the same figure, the other subframes can be used for LTE (overlay) transmissions and/or reception.

D2D discovery is the procedure/process of identifying other D2D capable and interested devices in the vicinity. For this purpose, the D2D devices that want to be discovered would send some discovery signals (on certain network resources) and the receiving UE interested in the said discovery signal will come to know of such transmitting D2D devices. Ch. 8 of 3GPP TS 36.843 describes the available details of D2D Discovery mechanisms.

D2D Discovery

ProSe (Proximity based Services) Direct Discovery is defined as the procedure used by the ProSe-enabled UE to discover other ProSe-enabled UE(s) in its proximity using E-UTRA direct radio signals via the PC5 interface. FIG. 10 schematically illustrates a PC5 interface for device-to-device direct discovery.

Upper layer handles authorization for announcement and monitoring of discovery information. For the purpose, UEs have to exchange predefined signals, referred to as discovery signals. By checking discovery signals periodically, a UE maintains a list of proximity UEs in order to establish communication link when it is needed. Discovery signals should be detected reliably, even in low Signal-to-Noise Ratio (SNR) environments. To allow discovery signals to be transmitted periodically, resources for Discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler in a discovering UE, which enables the discovering UE to use information from a discovered UE for certain applications. As an example, the information transmitted in ProSe Direct Discovery may be "find a taxi nearby", "find me a coffee shop", "find me the nearest police station" and the like. Through ProSe Direct Discovery a discovery UE can retrieve needed information. Additionally, depending on the information obtained, ProSe Direct Discovery can be used for subsequent actions in the telecommunication system, such as, for example, initiating ProSe Direct Communication.

ProSe Direct Discovery Models

ProSe Direct Discovery is based on several discovery models. The models for ProSe Direct Discovery are defined in 3GPP TS 23.303 V12.0.0, section 5.3.1.2 which is enclosed herein by reference:

Model A ("I am here")

Model A is also indicated as "I am here", since the announcing UE broadcasts information about itself, such as its ProSe Application Identities or ProSe UE Identities in the discovery message, thereby identifying itself and communicating to the other parties of the communication system that it is available.

According to Model A two roles for ProSe-enabled UEs that are participating in ProSe Direct Discovery are defined. ProSe-enabled UE can have the function of Announcing UE and Monitoring UE. An announcing UE announces certain information that could be used by UEs in proximity that have permission to discover. A Monitoring UE monitors certain information of interest in proximity of announcing UEs.

In this model the announcing UE broadcasts discovery messages at pre-defined discovery intervals and the monitoring UEs that are interested in these messages read them and process them.

Model B ("Who is There?"/"are You There?")

Model B is equivalent to "who is there/are you there" since the discoverer UE transmits information about other UEs that it would like to receive responses from. The transmitted information can be, for example, about a ProSe Application Identity corresponding to a group. The members of the group can respond to said transmitted information.

According to this model two roles for the ProSe-enabled UEs that are participating in ProSe Direct Discovery are defined: discoverer UE and discoveree UE. The discoverer UE transmits a request containing certain information about what it is interested to discover. On the other hand, the discoveree UE receives the request message can respond with some information related to the discoverers request.

The content of discovery information is transparent to Access Stratum (AS), which does not know the content of discovery information. Thus, no distinction is made in the Access Stratum between the various ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Types of Discovery

D2D communication may either be network-controlled, where the operator manages the switching between direct transmissions (D2D) and conventional cellular links, or the direct links may be managed by the devices without operator control. D2D allows combining infrastructure-mode and ad hoc communication.

Generally device discovery is needed periodically. Further D2D devices utilize a discovery message signalling protocol to perform device discovery. For example, a D2D-enabled UE can transmit its discovery message and another D2D enabled UE receives this discovery message and can use the information to establish a communication link. An advantage of a hybrid network is that if D2D devices are also in communication range of network infrastructure, a network entity like eNB can additionally assist in the transmission or configuration of discovery messages. Coordination/control by the eNB in the transmission or configuration of discovery messages is also important to ensure that D2D messaging does not create interference to the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

Type 1: A resource allocation procedure where resources for announcing of discovery information are allocated on a non-UE-specific basis, further characterized by:
The eNB provides the UE(s) with the resource pool configuration used for announcing of discovery information. The configuration may be signalled in SIB.
The UE autonomously selects radio resource(s) from the indicated resource pool and can announce discovery information.

The UE can announce discovery information on a randomly selected discovery resource during each discovery period.

Type 2: A resource allocation procedure where resources for announcing of discovery information are allocated on a per UE-specific basis, further characterized by:

The UE in RRC_CONNECTED may request resource(s) for announcing of discovery information from the eNB via RRC. The eNB assigns resource(s) via RRC.

The resources are allocated within the resource pool that is configured in UEs for monitoring.

The resources are according to the type 2 procedure for example allocated semi-persistently allocated for discovery signal transmission.

In the case UEs are in RRC_IDLE modus, the eNB may select one of the following options:

The eNB may provide a Type 1 resource pool for discovery information announcement in SIB. UEs that are authorized for ProSe Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED status, a UE authorized to perform ProSe Direct Discovery announcement indicates to the eNB that it wants to perform D2D discovery announcement. Then, the eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signalling (or no resource). The resources allocated by the eNB are valid until a) the eNB de-configures the resource(s) by RRC signalling, or b) the UE enters IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Radio Protocol Architecture

FIG. 11 schematically illustrates a Radio Protocol Stack (AS) for ProSe Direct Discovery.

The AS layer interfaces with upper layer (ProSe Protocol). Accordingly, the MAC layer receives the discovery information from the upper layer (ProSe Protocol). In this context, the IP layer is not used for transmitting the discovery information. Further, the AS layer has a scheduling function: the MAC layer determines the radio resource to be used for announcing the discovery information received from the upper layer. In addition, the AS layer has the function of generating Discovery PDU: the MAC layer builds the MAC PDU carrying the discovery information and sends the MAC PDU to the physical layer for transmission in the determined radio resource. No MAC header is added.

In the UE, the RRC protocol informs the discovery resource pools to MAC. RRC also informs allocated Type 2 resource for transmission to MAC. There is no need for a MAC header. The MAC header for discovery does not comprise any fields based on which filtering on Layer 2 could be performed. Discovery message filtering at the MAC level does not seem to save processing or power compared to performing filtering at the upper layers based on the ProSe UE and/or ProSe Application ID. The MAC receiver forwards all received discovery messages to upper layers. MAC will deliver only correctly received messages to upper layers.

In the following it is assumed that L1 indicates to MAC whether a discovery message has been received correctly. Further, it is assumed that the Upper Layers guarantee to deliver only valid discovery information to the Access Stratum.

Prior art solutions for allocation of resources for discovery in D2D systems do not allow determining a resource pattern or a configuration suitable for allocating resources in a manner that is suitable for the requested D2D service. Specifically, based on the information transmitted by the D2D capable device according to common signaling procedures, the base station could allocate the transmission resources for a too-short time period for allowing the UE to broadcast the complete discovery information. Consequently, the transmitting UE needs to request resources again, thereby leading to an increase of signaling overhead into the LTE system.

Moreover, for example, information on the content of discovery information is transparent to the Access Stratum (AS). Therefore, no distinction is made in the Access Stratum between the various ProSe Direct Discovery models and types of ProSe Direct Discovery, and the base station would not receive any information useful for determining the model of discovery transmission and the type of preferred procedure for allocating discovery resources.

SUMMARY OF THE INVENTION

One exemplary embodiment provides a user equipment and a method for performing allocation of resources in a D2D communication system. A resource request message for allocation of resources for discovery transmission including information on the amount of data to be transmitted and on discovery information is generated at the user equipment and transmitted to the base station.

The object of the invention is solved by the subject matter of the independent claims. Advantageous embodiments are subject to the dependent claims.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same

BRIEF DESCRIPTION OF THE FIGURES

In the following the exemplary embodiments will be described in more detail in reference to the attached figures and drawings. Similar or corresponding details in the figures are marked with the same reference numerals.

FIG. 9 is a schematic illustration showing a system including D2D capable user equipments;

FIG. 10 shows a schematic representation of the PC5 interface for device-to-device direct discovery;

FIG. 11 shows a schematic representation of the Radio Protocol Stack for ProSe Direct Discovery;

DETAILED DESCRIPTION

Figure 1:
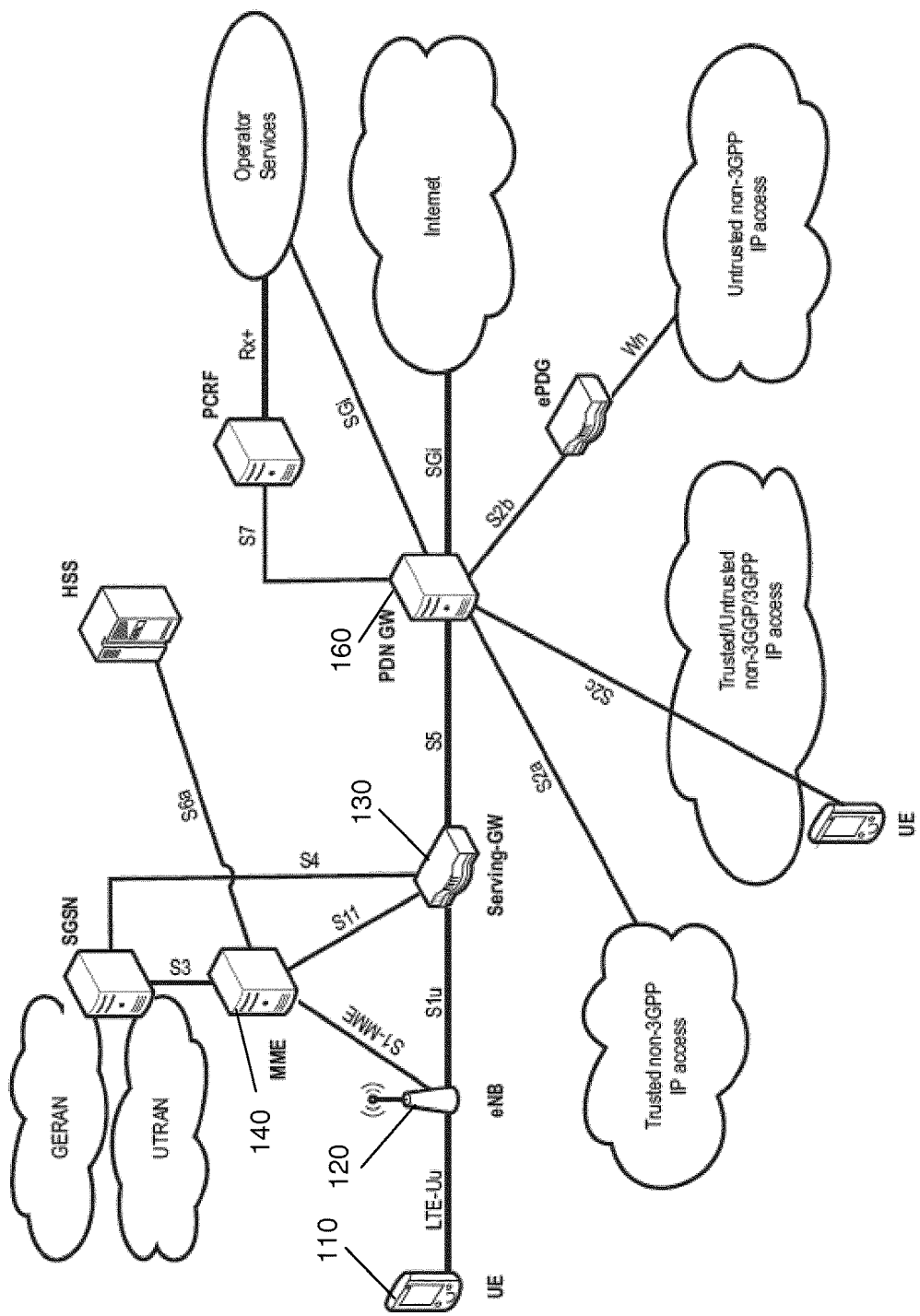
FIG. 1 shows an exemplary architecture of a 3GPP LTE system.
Figure 2:
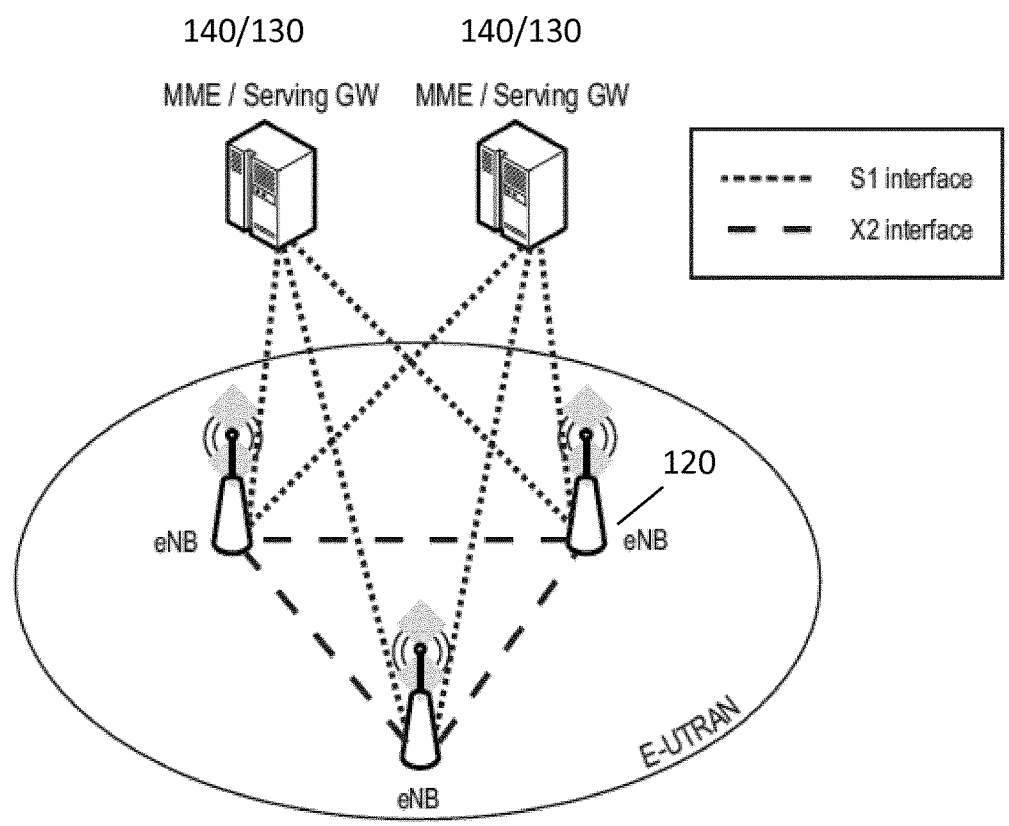
FIG. 2 shows an exemplary overview of the overall E-UTRAN architecture of 3GPP LTE.
Figure 3:
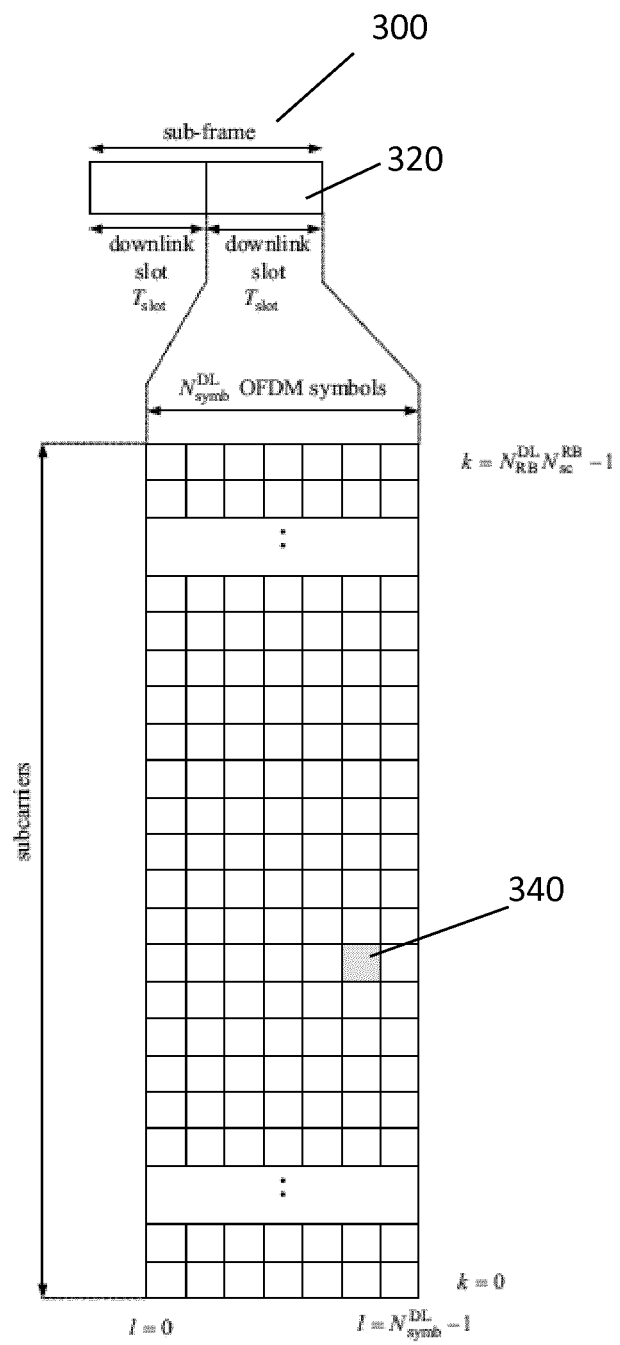
FIG. 3 shows exemplary subframe boundaries on a downlink component carrier as defined for 3GPP LTE (Release 8/9)
Figure 4:
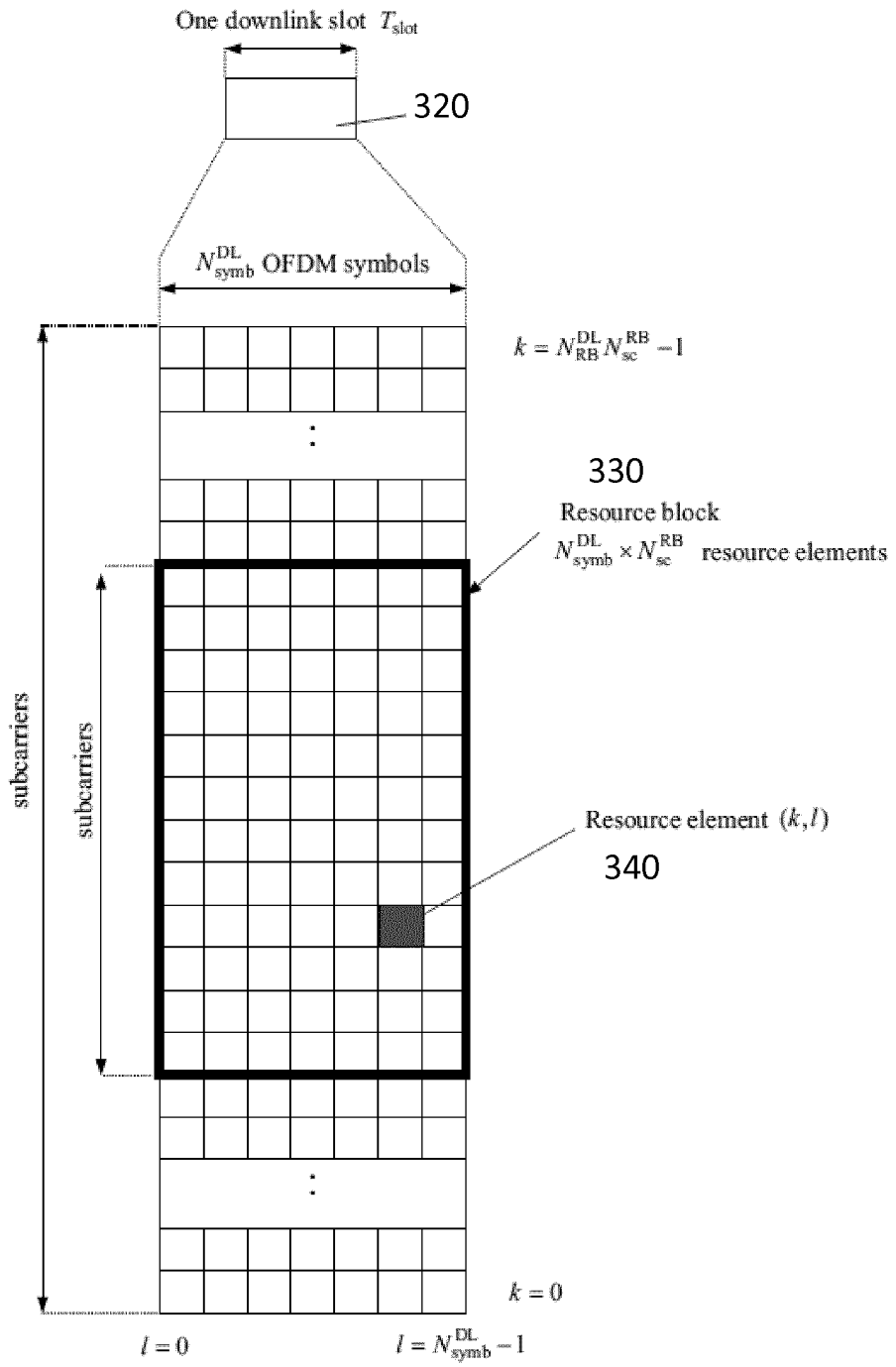
FIG. 4 shows an exemplary downlink resource grid of a downlink slot as defined for 3GPP LTE (Release 8/9)
Figure 5:
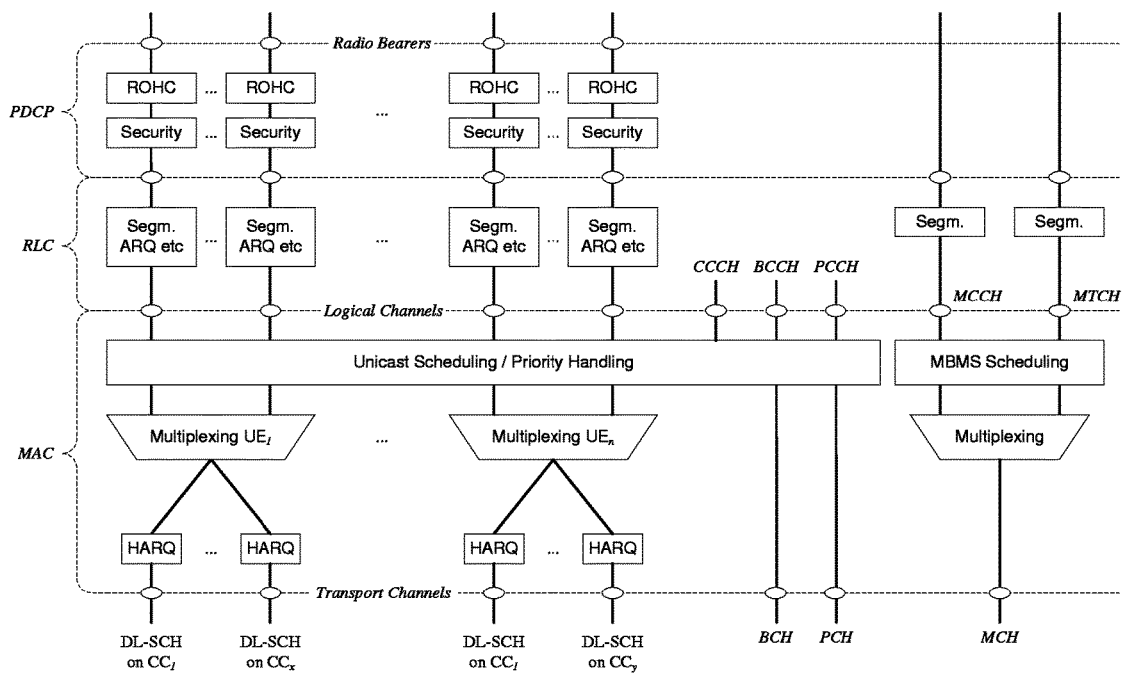
FIGS. 5 and 6 show the 3GPP LTE-A (Release 10) Layer 2 structure with activated carrier aggregation for the downlink and uplink, respectively.
Figure 6:
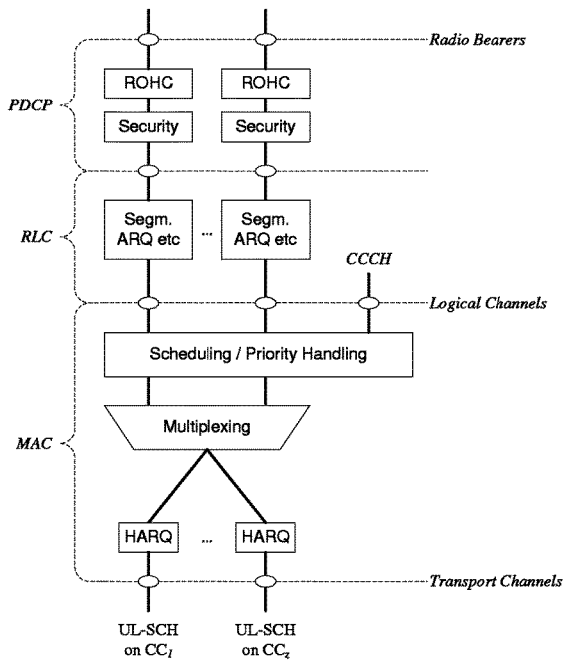
Figure 7:
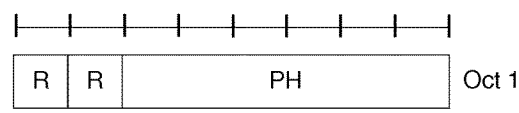
FIG. 7 shows the structure of a MAC Control Element.
Figure 8:
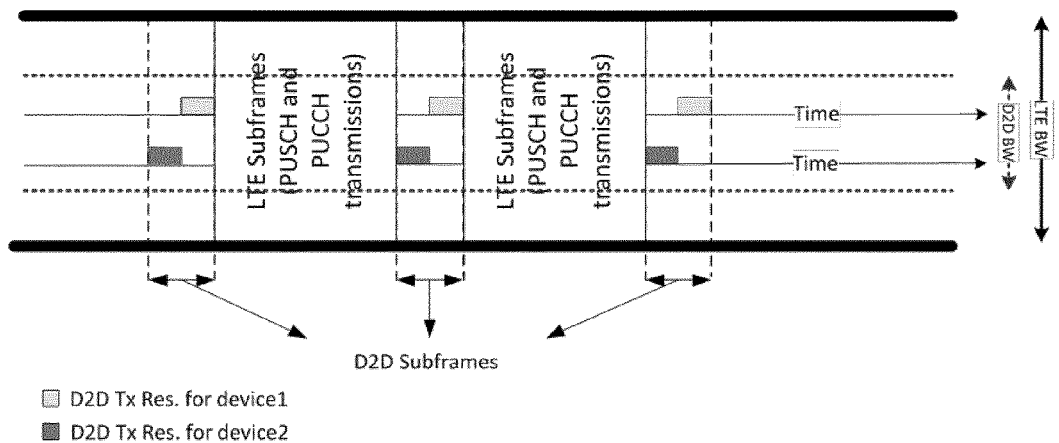
FIG. 8 is a schematic illustration showing the overlay (LTE) and the Underlay (D2D) transmission and reception resources in D2D subframes.

The following paragraphs will describe various exemplary embodiments. For exemplary purposes only, most of the embodiments are outlined in relation to a radio access scheme according to 3GPP LTE (Release 8/9) and LTE-A (Release 10/11/12) mobile communication systems, partly discussed in the Technical Background section above. It should be noted that the exemplary embodiments may be advantageously used, for example, in a mobile communication system such as 3GPP LTE-A (Release 10/11/12) communication systems as described in the Technical Background section above, but the exemplary embodiments are not limited to their use in this particular exemplary communication network.

The term "direct link" used in the claims and in the description is to be understood as a communication link (communication channel) between two D2D user equipments, which allows the exchange of data directly without the involvement of the network. In other words, a communication channel is established between two user equipments in the communication system, which are close enough for directly exchanging data, bypassing the eNodeB (base station). This term is used in contrast with "LTE link" or "LTE (uplink) traffic", which instead refers to data traffic between user equipments managed by the eNodeB.

The term "transmitting user equipment" used in the claims and in the description is to be understood as a mobile device capable of transmitting and receiving data. The adjective transmitting is only meant to clarify a temporary operation. The transmitting user equipment in the following and for the purpose of discovery transmission can be an announcing user equipment or a discovering user equipment (discoverer). The term is used in contrast to "receiving user equipment", which refers to a mobile device temporarily performing the operation of receiving data. The receiving user equipment in the following and for the purpose of discovery transmission can be a monitoring user equipment or a user equipment to be discovered (discoveree).

The term "discovery transmission" used in the claims and in the description is to be understood as transmission of a discovery announcement by a transmitting equipment or as a request indicating information the transmitting equipment is interested to discover.

The term "discovery information" used in the claims and in the description is to be understood as information that the transmitting user equipment transmits to the base station to the purpose of resource allocation for discovery transmission. Discovery information includes any information which can be used, together with the amount of data to be transmitted, by the base station in order to effectively allocate resources for discovery transmission.

In the following, several examples will be explained in detail. The explanations should not be understood as limiting the invention, but as a mere exemplary embodiments to better understand the invention. A skilled person should be aware that the general principles as laid out in the claims can be applied to different scenarios and in ways that are not explicitly described herein. Correspondingly, the following scenario assumed for explanatory purposes of the various embodiments shall not be limiting as such.

An exemplary aspect of the invention is related to the discovery procedure for Device-to-Device communication, for example for proximity services (ProSe).

An eNB may provide D2D reception discovery resources in System information Broadcast (SIB). These resources may cover resources used for D2D transmission in the cell in which a transmitting user equipment is registered (current cell), as well as resources used in neighbor cells. A SIB in a Device-to-Device communication system is the broadcast of information pertaining to D2D in the underlay network. The network, i.e., eNB or base station, may broadcast information related to D2D (called D2D SIB(s)) in separate System Information Blocks (SIB). Same or different SIBs may indicate the D2D resources for Receiving Inter-cell Discovery messages.

For D2D capable UEs which are in the coverage of a network, i.e., referred to as in-coverage UEs, the discovery procedure can be distinguished between idle mode UEs and connected mode UEs, i.e., UEs having established a RRC connection to the network. The two modes will be described below in connection with FIG. 12.

For user equipments in IDLE 400 the UE reads D2D related SIB information provided by the base station or by the network, which may be, for instance information on whether the base station respectively whether this cell supports D2D or not (401, 402). The base station may further provide a Type 1 transmission resource pool in the System information Broadcast 410, in which the resources are allocated independently from the UE. The UEs that are authorized for D2D Discovery use the resources in the transmission pool in IDLE. In other words, the UE may choose from a transmission resource pool from the available resources and start transmitting a discovery message.

Alternatively, if no information on the transmission resource pool is provided by the base station (401), then the UE may switch its status to the connected mode (402) and then request D2D resources for discovery transmission. More in particular the D2D-enabled UE will initiate the RRC connection establishment procedure in order to move to RRC connected mode and further indicate the request for resources for the transmission of discovery announcements. At this point, the base station may send a response to the request of the UE setting the procedure for allocating resources. The base station may choose now to allocate resources on a non-UE-specific basis (type 1 procedure).

Allocation of resources in connected mode may be done by exchanging RRC messages (431). Once allocation of resources is completed, the UE can start transmitting the discovery message (441).

According to a further alternative, the base station may use an allocation procedure, where resources for announcing of discovery information are allocated on a per UE-specific basis (type 2 procedure). Accordingly, the base station indicates a transmission resource pool but does not allocate transmission resources specific to the user equipments. Instead, the UE autonomously selects radio resource(s) from the indicated resource pool and announces discovery information (430).

In the connected mode, a UE authorized to perform D2D discovery transmission sends to the base station requests to establish D2D discovery transmissions. Specifically, the UE requests to the base station configuration of discovery transmission resources (430, 431). Besides the request for configuration of discovery transmission resources, the UE may also transmit to the base station further information. The further information may include an indication of the type of discovery procedures the UE wishes to use for discovery transmission. In accordance with the request from the UE, the base station allocates resources according to a type 1 or a type 2 procedure as described above (440, 441).

Figure 12:
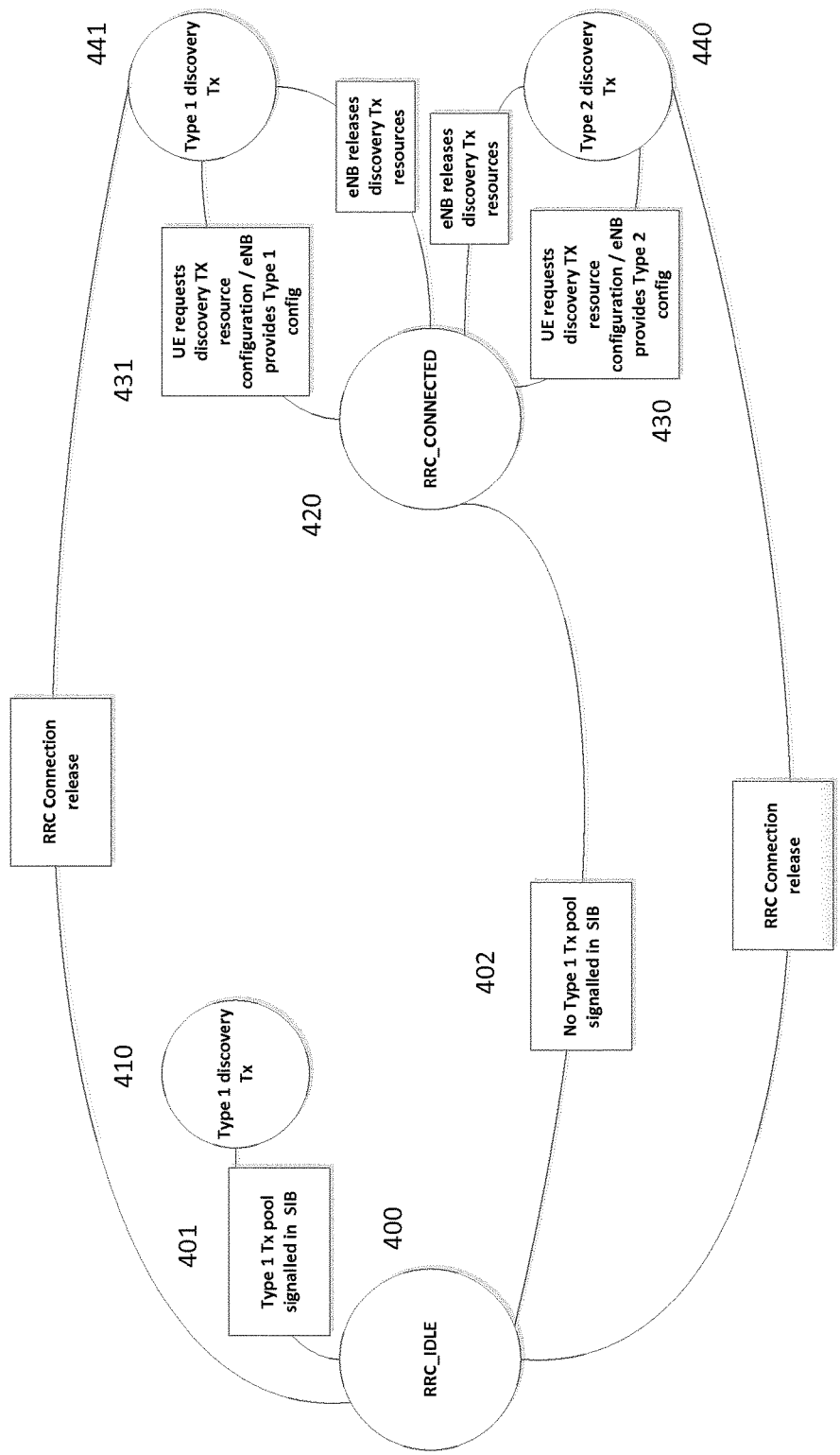
FIG. 12 is a diagram showing the IDLE and CONNECTED mode in the reception of discovery resources according to an exemplary example.
Figure 13:
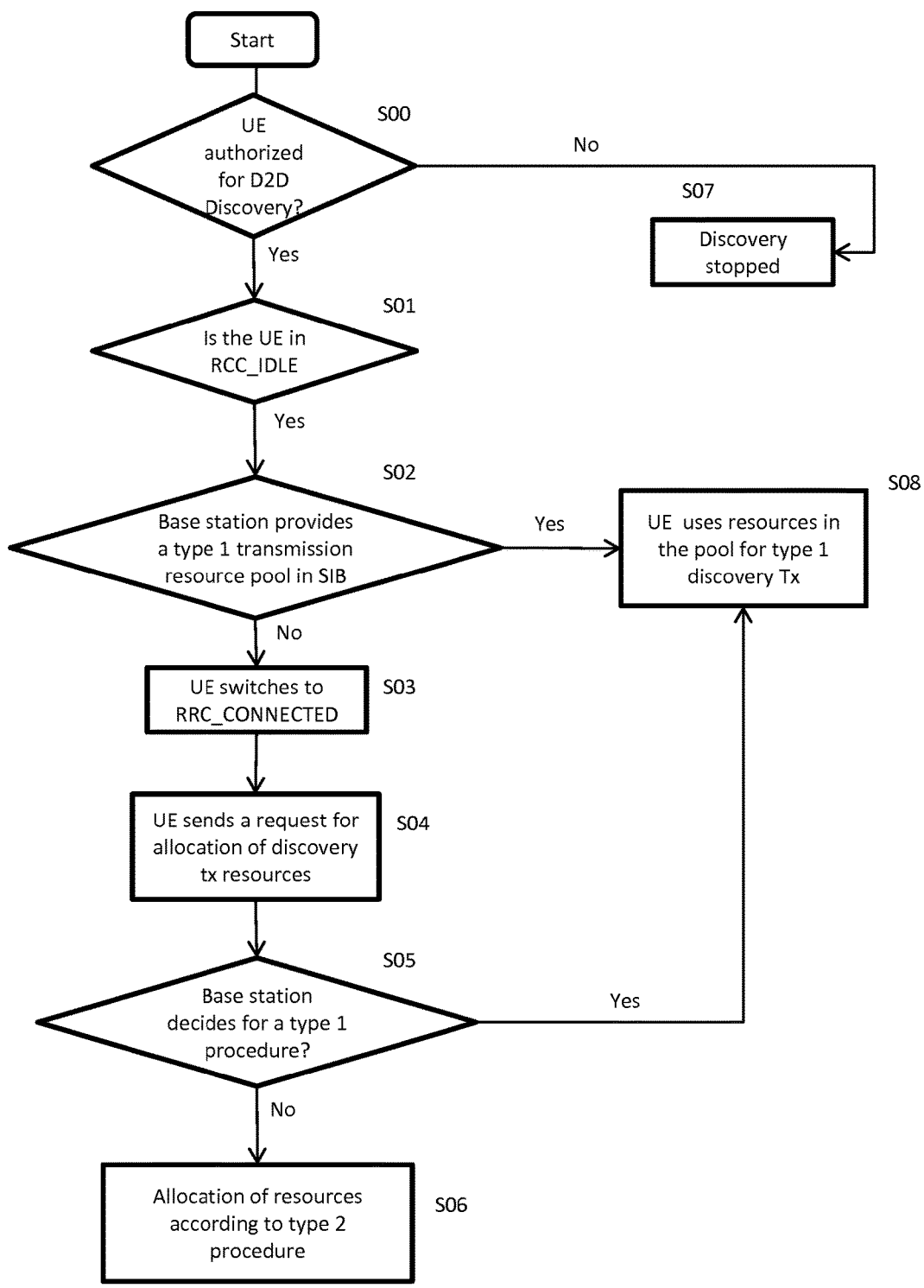
FIG. 13 is a flow chart illustrating the scheme for allocation of resources for discovery transmission in a D2D communication system.

FIG. 13 is a flow chart illustrating the scheme for allocation of resources for discovery transmission in a D2D communication system according to the invention as described in connection with FIG. 12. Firstly, the base station determines at step S00 whether the UE is authorized for D2D discovery. Although this step is shown in this example at the beginning of the discovery resource allocation procedure, step S00 does not have to be necessarily part of the D2D discovery resource allocation procedure and it may be done at an earlier point of time. Alternatively, determination whether the UE is authorized for D2D discovery can be performed within the resource allocation procedure. If the UE is not authorized for D2D discovery, the procedure for transmitting discovery information is stopped at step S07. In step S01 the transmitting UE is in an idle mode, for example in an RRC_IDLE mode. The transmitting UE reads D2D related SIB information to determine whether the base station or the cell in which the transmitting user equipment is logged. Specifically, the UE determines whether the base station provides the SIB with a transmission resource pool (step S02). If the type 1 transmission resource pool is provided by the base station, it may be determined, whether the transmitting UE is authorized for performing D2D discovery, in the case this was not done before. Thereafter, the transmitting UE uses the resources in the transmission resource pool for performing a type 1 discovery transmission (step S08).

Figure 14:
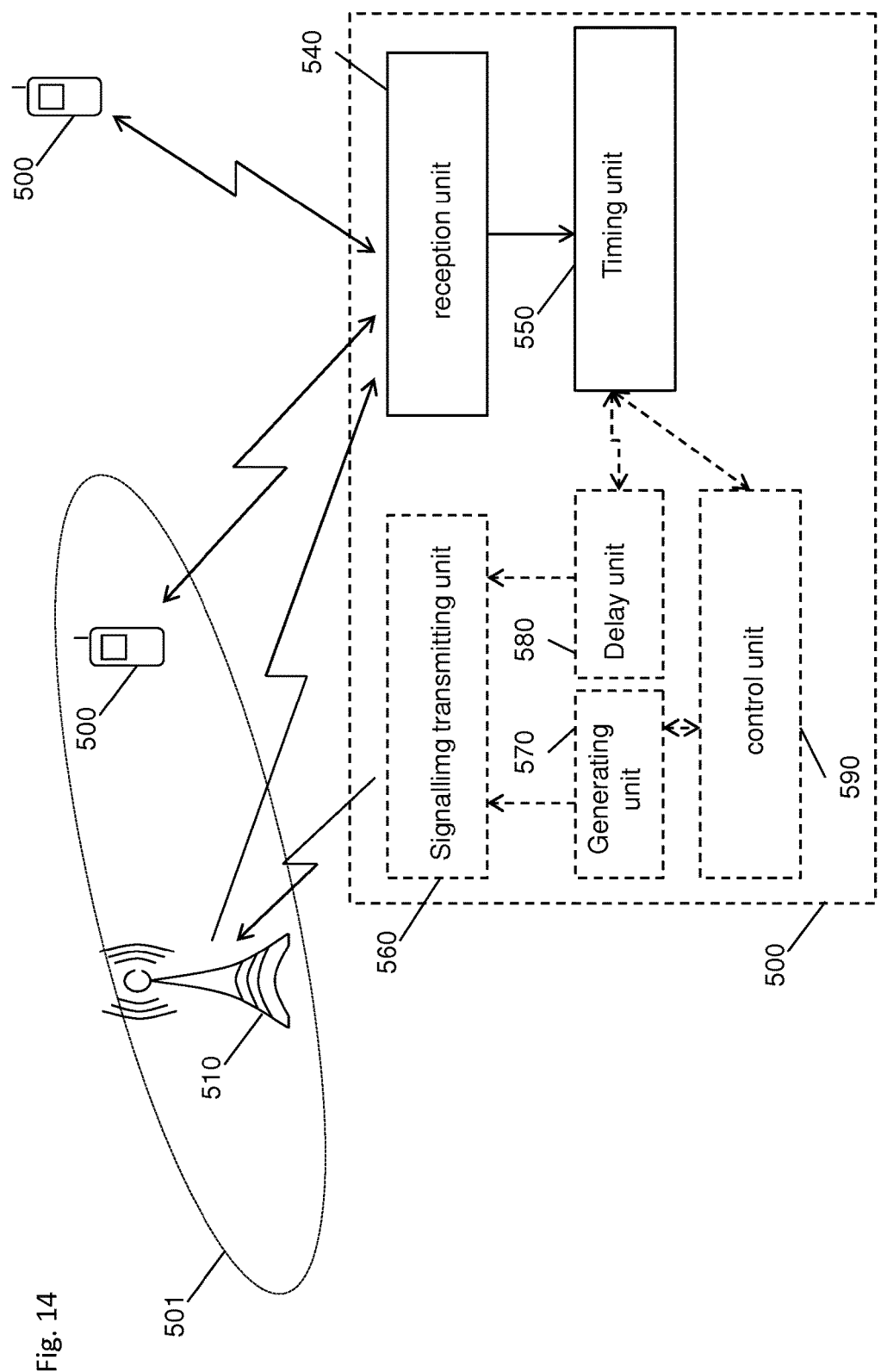
FIG. 14 illustrates schematically a D2D communication system including a base station and transmitting/receiving equipments according to an exemplary embodiment.

If the base station does not provide a transmission resource pool for discovery transmission according to a type 1 procedure, the UE switches in step S03 to a RRC_CONNECTED mode. Switching to RRC_CONNECTED corresponds to a new RRC connection establishment trigger. In other words, the RRC establishment procedure is triggered by Access Stratum due to the absence of D2D Type 1 transmission resource pool information. Therefore, according to one embodiment a new establishment cause value is introduced in the RRC connection request message, i.e., establishmentCause field in RRCConnectionRequest message (see section 5.3.3 of TS36.331). This new establishmentCause value indicates that UE wants to establish RRC connection for the purpose of D2D or alternatively for the purpose of D2D discovery. Next in step S04 the UE sends to the base station a resource request message for allocation of resources for discovery transmission, the resource request message including information on the amount of data to be transmitted. The resource request message may also include further information according to which the base station can decide how may resources to allocate for the discovery transmission and for how long said resources should be made available to the transmitting user equipment. The further information as well as the effects and advantages associated thereto will be explained later in relation to a further exemplary embodiment. The radio resource request message can be according to one embodiment also sent as part of the RRC connection establishment procedure. In the affirmative case, the base station can decide, based on the information within the resource request message or based on other parameters, such as the availability of resources, or on the collision rate, whether the allocation of resources should be carried out according a UE independent (type 1) or UE-specific (type 2) allocation procedure. If in step S05 the base station decides for a type 1 resource allocation procedure, the process jumps to step S08. Alternatively, if the base station decides for a type 2 resource allocation procedure, the transmitting UE requests allocation of resources according to a UE-specific procedure (type 2 procedure). Once the resources for discovery transmission are allocated, the transmitting UE proceeds with discovery transmission FIG. 14 illustrates schematically a D2D communication system according to the invention including a base station 510 and ProSe capable UEs or transmitting/receiving equipment 500 according to an exemplary embodiment. For explanation proposes in the following we will refer to the UE as transmitting UE or simply UE. It has however to be understood that such device is clearly also capable of receiving data in the D2D communication system on a standard LTE channel and on a direct link data channel.

The UE 500 includes a generating unit 570, which is adapted to generate a resource request message for allocation of resources for discovery transmission. The resource request message includes information on the amount of data needed for transmitting discovery announcements or messages. The value on the amount of data to be transmitted is then output to a signalling transmitting unit 560 and then transmitted to the base station 510. Based on the value on the amount of data to be transmitted, the base station 510 can allocate the exact amount of resources needed by the UE for transmitting the discovery announcement. In addition to information on the data amount to be transmitted, the generating unit may also generate discovery indication. Discovery indication may include any information relative to the transmission of the discovery message and is used by the base station 510 to allocate the resources and the time slots for discovery transmission in order to increase the efficiency of the discovery transmission. The discovery indication and the information on the data amount to be transmitted are multiplexed at a multiplexing unit (not shown) into the resource request message. The transmitting unit 560 then transmits the generated resource request message to the base station.

The UE further includes a reception unit or receiving unit 540 adapted to receive a message from the base station allocating the resources for discovery transmission. In addition, the UE may optionally include a delay unit 560, a control unit 590 and a timing unit 550. These units will be described in detail with reference to a further exemplary embodiment.

The discovery indication may be an indication on discovery and may include at least one of a type of discovery service, a duration of the discovery transmission, a number of discovery transmissions, a preferred resource allocation pattern and a preferred type of discovery transmission procedure. This list is only for explicative purposes and it does not have to be understood as being exhaustive or limiting. Any other information that can be used by the base station 510 in order to perform allocation of resources may be used in addition to or instead of the information pieces listed above.

Additional information indicating the type of discovery service may be used by the base station for prioritizing assignment of resources to the UE. The UE may need to broadcast a discovery message concerning, for example, public safety. This could be the case if an accident occurred and a section of a road is dangerous or impracticable. Any delay in transmission of such discovery message may have some serious consequence on the security of the users and in general of the traffic participants. In this case the generating section may include in the resource request message information on the type of discovery service, which indicates that the discovery is for public safety. According to this additional information the base station may give a higher priority to the discovery message. As an example, based on the additional information on the type of discovery service, the base station may decide to allocate resources for discovery transmission using a type 2 procedure. As already described above, such procedure allows to allocate resources in a manner specific to the UE sending the request. Such procedure has the advantage that there will be no collision among different UEs, thereby increasing discovery transmission efficiency. In addition, the information on the type of discovery service may be used by the base station for deciding the size of the resources to be allocated in a defined timeframe.

As a further embodiment of the invention, the discovery indication may include the number of discovery transmissions to be carried out by the UE or the duration of the discovery transmission. To this end, the UE may include a timing unit 550 adapted to calculate the timing and the number of discovery transmissions. The timing unit is however not necessary and the timing function may be carried out by any other unit in the UE. Alternatively, the timings may be fixed and timing information may be available to the UE. The timing information or the information on the number of discovery transmissions may be used by the base station 510 in order to allocate the resources for discovery transmission for the necessary time window. This allows preventing the UE 500 from repeatedly sending to the base station a request for allocating resources discovery transmission, thereby reducing signaling overhead.

Another example of discovery indication may be information on whether the discovery type is model A or model B, which have been described in detail in the introductory portion.

The transmitting user equipment 500 may include in the resource request message a type of discovery transmission procedure. The type of discovery transmission procedure includes a first procedure, wherein the allocation of resources for discovery transmission is independent from the transmitting user equipment. The first procedure corresponds to the type 1 allocation procedure described in the introductory portion. In addition or alternatively the type of discovery transmission procedure includes a second procedure, wherein the allocation of resources for discovery transmission is specific for the transmitting user equipment. The second procedure corresponds to the type 2 allocation procedure described in the introductory portion.

According to an exemplary embodiment of the invention, the resources of discovery transmission are requested using the RRC protocol. Accordingly, the resource request message is a radio resource control message. A new RRC message is introduced which carries the resource request information, e.g., ProseDiscoveryIndication message. In response to this request message the base station will send a new RRC message, e.g., DiscoveryResourceCon fig message, containing the resource configuration for D2D discovery announcements, i.e., either the transmission resource pool information (type 1) or the dedicated resource allocation info (type 2).

Alternatively, the request for allocating resources for discovery transmission can be implemented in a SR/BSR signaling procedure for D2D communication, by using a common signaling scheme for discovery and data transmission.

A scheduling request (SR) may be transmitted via resources of the PUCCH allocated by the base station, i.e., also referred to as dedicated scheduling request (D-SR). A dedicated scheduling request is usually one bit long, and corresponding periodic PUCCH resources allow transmitting the scheduling request but are not sufficient for transmitting further data such as the buffer status report or actual data of the transmission buffer. As described in the technical background section, in LTE a scheduling request is triggered for the case that a buffer status report has been triggered but there are no PUSCH resources available for the transmission of the buffer status report. In other words the purpose of the scheduling request is to ask the base station for the allocation of PUSCH resources so that UE could transmit the buffer status report, which in turn enables the base station to allocate adequate resources for the transmission of the uplink data.

A D2D enabled transmitting UE transmits a scheduling request (SR) either on the PUCCH (D-SR) or on RACH when there is a buffer status report triggered for D2D bearers, e.g., when new data arrives for a D2D bearer. This scheduling request is transmitted in a regular LTE uplink time/frequency resource, i.e., not on a time/frequency resource reserved for D2D. Upon receiving this scheduling request the base station 510 will allocate PUSCH resources to the D2D transmitting UE. The D2D transmitting UE will transmit in turn the D2D related buffer status information within this PUSCH resources as described already above. Based on the detailed buffer status information, the base station 510 will allocate D2D time/frequency resources for the D2D data communication.

As mentioned above the second uplink grant/resource allocation, i.e., upon having received the D2D related buffer status information, may use a different resource allocation format/DCI, e.g., addressed to a D2D RNTI.

Figure 15:
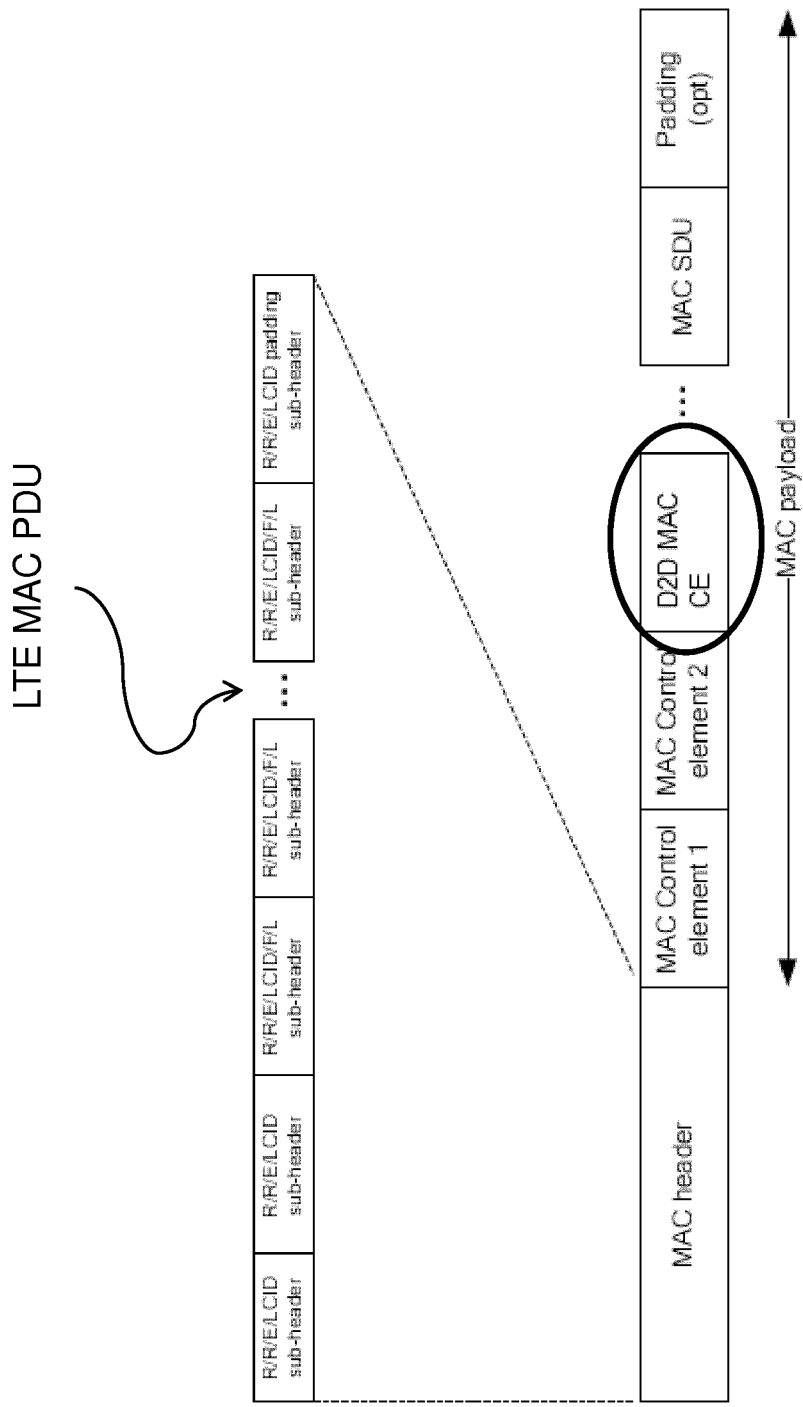
FIG. 15 illustrates a composition of a MAC Protocol Data Unit (PDU) according to an implementation of the scheduling method and system according to the invention.

FIG. 15 describes a composition of a MAC Protocol Data Unit (PDU) according to an implementation of the above-described scheduling scheme. The MAC Protocol Data Unit referred to in the buffer status reporting procedure according to the scheduling method described above incorporates a control element for performing D2D related signaling. Preferably, the scheduling information for D2D communication may be a D2D dedicated Buffer Status Report, which may be implemented by a MAC control element for D2D communication. Accordingly, the MAC Protocol Data Unit transmitted on the PUSCH may include, besides the MAC control elements, such as MAC BSR/PHR CEs (indicated in FIG. 11 as MAC CE1 and MAC CE2), used for performing scheduling in uplink LTE traffic, also one or more D2D MAC control element, which will be used for performing scheduling of the resources for transmitting data from the transmitting user equipment to the receiving user equipment on the direct link channel.

The D2D MAC control element in the MAC PDU may be further associated to an identification number. Said identification number may be, for example, a reserved logical channel ID, which may be stored in the header of the MAC PDU, i.e., MAC subheader. Advantageously, the identification number may be stored in the R/R/E/LCID subheader corresponding to the D2D MAC CE. Accordingly, the base station will be able to distinguish which buffer status report in the MAC PDU has to be used for scheduling procedures of D2D data transmission on the direct link connection or for scheduling LTE cellular uplink traffic. This logical channel ID may be one of the reserved logical channel IDs (LCIDs).

According to an exemplary embodiment, if the UE is authorized to transmit discovery messages, it sends a scheduling request (SR) and D2D Buffer Status Report (BSR) for requesting radio resources or for configuring discovery transmission. The discovery scheduling request is transmitted to the base station on an uplink data channel for data transmission. As an example, the discovery scheduling request may be transmitted within a MAC control element for direct link communication. MAC control element for direct link communication may be a D2D BSR MAC Control Element in the LTE MAC PDU.

According to an exemplary embodiment of the invention, the D2D BSR MAC Control Element may comprise an identification value, such as a flag, which identifies whether the transmission is discovery transmission or data transmission. If the flag indicates discovery, the reported amount of bytes corresponds to the discovery message size. On the other hand, if the flag indicates that the D2D BSR MAC Control Element is for requesting allocation for D2D data transmission, the reported amount of bytes corresponds to the data of the D2D bearers.

In addition or alternatively, if the flag indicates that the D2D BSR MAC CE is for discovery transmission, the latter may contain additional information as already explained before, like a suggested pattern, information on whether the discovery message is public safety or non-public safety, or the preference of the UE for Type1/Type2 allocation.

Specifically, information that the discovery transmission procedure is of type 1 communicates to the base station that the allocation of resources for discovery transmission is independent from the transmitting user equipment. The type 1 transmission procedure is also indicated as first procedure.

Specifically, information that the discovery transmission procedure is of type 2 communicates to the base station that the allocation of resources for discovery transmission is specific for the transmitting user equipment. The type 2 transmission procedure is also indicated as second procedure.

Discovery transmission may be stopped by the base station either after the time indicated in the resource request message transmitted by the UE or on its own motion, in order to manage the resources available in the cell. Alternatively, the base station may interrupt the discovery transmission because it does not know that the UE still wants to transmit discovery messages. This could happen, for example, if the UE is transmitting discovery announcements according to Mode B, described before. In this case, the UE periodically sends discovery announcements including information on what the UE is interested to discover and waits until a discoveree positively answers to the announcement request.

As an example of transmission interruption, the base station may deconfigure the allocated resources for discovery transmission (announcement). Alternatively, the base station may release the RRC connection of a D2D UE even though the D2D UE still intends to continue with the discovery announcements.

In an exemplary embodiment of the invention, the receiving unit 540 of the UE 500 may receive from the base station 510 an interrupt message for interrupting discovery transmission. This can occur when the base station deconfigures resources or releases the RRC connection. Thus, the interrupt message includes at least one of a de-configuration message for de-configuring the allocated resources for discovery transmission or a release message for releasing a radio resource control connection.

According to standard communication schemes, the UE would re-start the discovery transmission procedure right after the resources are deconfigured or the RCC connection has been released by the base station. A new request for an RRC connection or a request for discovery transmission resources is thus transmitted to the base station. However, if the base station deconfigures the transmission resources because the latter are not available anymore, transmission of a new request for allocation of resources will merely increase the signalling overhead, without successfully obtaining for the UE an allocation of resources. In order to avoid that, the UE re-transmits a request for allocation of resources for D2D discovery announcement immediately after the connection has been released or the resources have been deconfigured; in an exemplary embodiment a prohibit mechanism is introduced which prevents UE from requesting discovery resources for a specified time after the resources have been deconfigured. To this end, the base station 510 may send, along with a deconfiguration message, a timer value to the UE. The receiving unit 540 sends the timer value to the delay unit 580, and the delay unit 580 controls the transmitting unit 560 and delays the transmission according to the received timer value.

The timer value may be signalled by the base station 510 within an interrupt message resource deconfiguration message or within the message for releasing the RRC connection. Alternatively, the timer value may be specified at the time the resources for discovery transmission were allocated. For example, the timer value may be specified in the message transmitted by the base station for granting the resources for discovery transmission. Thus, information on the predetermined time for which the transmission of a new resource request message is inhibited may be included in the received de-configuration message or in the resource configuration message.

As an alternative or in addition to the timer value, the base station may include within the RRC connection release message Type 1 transmission resource pool information. Accordingly, after interruption of transmission by the base station, the UE may independently choose resources for discovery transmission from the transmission resource pool and re-start discovery transmission independently from the base station.

In another exemplary embodiment of the invention, the transmitting user equipment 500 which has been configured for Type 1 discovery transmission in RRC_CONNECTED,—in the case, for example that the base station provided transmission resource pool information to the transmitting user equipment in response to the radio resource request—is allowed to continue sending discovery announcements also in RRC_IDLE mode. Type 1 discovery resources are allocated on a non-UE-specific basis even for the case that the allocation is realized when UE is in RRC_CONNECTED mode. Therefore, the allocated resource can be used by other UEs even if the UE does not explicitly request the release of the allocated resources. Therefore, Type 1 discovery resources allocated when UE is RRC_CONNECTED can be used also when UE has transited to RRC_IDLE. For example, the UE is allowed to continue sending D2D discovery announcements upon having been sent to RRC_IDLE mode until the validity timer or timer value expired. More specifically, the validity timer started in RRC_CONNECTED should be continued even if UE enters RRC_IDLE. Accordingly, the UE is authorized to do discovery announcements for a certain ProSe Application for the duration of the validity timer. The validity timer may be assigned during the authorization procedure. Alternatively the base station may indicate in the RRCConnectionRelease message for how long the UE is allowed to continue discovery announcements according to Type 1 resource allocation procedure in RRC_IDLE mode.

In another exemplary embodiment of the invention, the transmitting user equipment 500 generates status information including a continuation message, or keep or maintain message for requesting the base station 510 to maintain the resources allocated for discovery transmission, and/or a stop message indicating that the allocated resources for discovery transmission can be de-configured. The status information may be transmitted to the base station at predefined time intervals.

For example, the UE in RRC_CONNECTED may send the keep message to the base station indicating that it wants to continue discovery announcement or maintain the allocated transmission resources for discovery announcement. Thus, the keep message may be sent independently to the base station, for example using the RRC protocol. A ProseDiscoveryIndication message may be, for instance, sent again in order to indicate that UE wants to continue with discovery announcements. Alternatively, the keep message may be conveyed by a MAC control element, such as for instance the D2D MAC control element described in connection with FIG. 15. The keep message may be sent to the base station at predetermined time intervals, which can be chosen to be shorter than the time interval after which the base station deconfigures transmission resources. Determination of the time interval may be done at the timing unit 550. The timing unit may output the determined time interval to the control unit 590. Subsequently, the control unit 590 may instruct the generating unit to generate the keep message. The generating unit 570 may generate the keep message as an independent message to be transmitted on the RRC protocol, or it may include the keep message in a MAC CE as described above. The generated keep message or the MAC CE including keep information is then output to the transmitting unit and transmitted to the base station. Alternatively, the timing unit may output the determined time information directly to the transmitting section 560.

In addition or alternatively to the keep message, the UE may send a stop message or indication to the base station. The stop message indicates that the UE does not need transmission resources for discovery announcement anymore. Similarly to the keep message, it may be sent independently to the base station using the RRC protocol, such as a ProseDiscoveryIndication message with zero buffer size or predefined values, or it may be included in a MAC control element, such as for instance the D2D MAC control element described in connection with FIG. 15. Generation of the stop message can be instructed by the control unit 590 once the control unit decides that discovery transmission can be interrupted. The higher layer within the UE, e.g., Proximity application layer, may indicate to the access stratum layer within the UE to generate the stop message. Upon reception of the stop indication, the base station deconfigures the transmission resource for discovery announcements or moves the UE to RRC_IDLE. The above-described configuration can be advantageously used in particular if the UE is transmitting discovery announcements according to model B. By sending the keep message, the UE can prevent the base station from deconfiguring transmission resources for discovery announcements or to bring the UE to RRC_IDLE mode, while the UE actually still intends to periodically transmit discovery announcements. Similarly, by sending the stop message, the UE can inform the base station that transmission resources for discovery announcements can be deconfigured or, more generally that the discovery transmission can be interrupted/stopped. This prevents the base station from keeping configuration of resources unnecessary long. Accordingly, the configuration described above allows reducing signaling overhead, by preventing the base station to interrupt discovery transmission before time and thus preventing the UE to re-send a new resource request message. Further, the transmission of a stop message by the UE allows the base station to free transmission resources, which can be used for fulfilling allocation requests from other UEs in the cell, thereby increasing the efficiency of the system.

The base station 510 for use in the direct link communication system described above may comprise a receiving unit (not shown) adapted to receive from the transmitting user equipment 500 a resource request message for allocation of resources for discovery transmission. The base station 510 may further include a generating unit (not shown) adapted to generate, in response to the received resource request message, a resource configuration message allocating the requested resources for discovery transmission, and a transmitting unit (not shown) adapted to transmit the generated resource configuration message to the UE.

Figure 16:
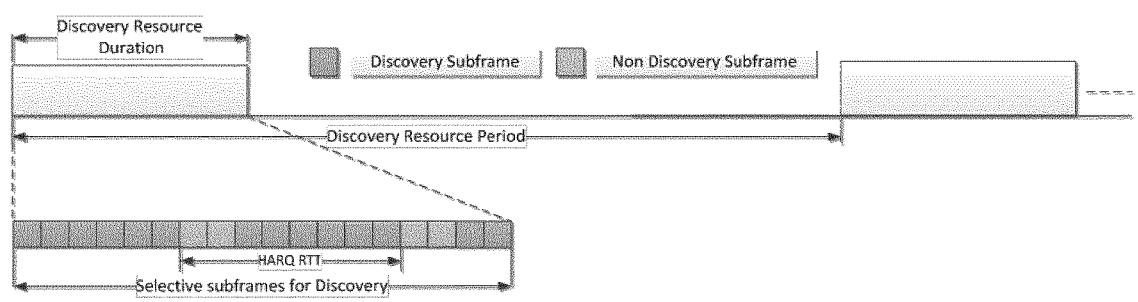
FIG. 16 is a schematic drawing illustrating the resource allocation within a discovery resource period.

According to an exemplary embodiment of the invention, the base station 510 may further include a deciding section (not shown). The deciding section may be in charge of managing the allocation of resources and of deciding the type of transmission protocol and allocation resource pattern to be used by the UE for transmission of discovery announcements. For example, the resource request message transmitted by the UE may include ProSe discovery indication, such as the type of discovery procedure or the estimated duration of the transmission or the number of the transmission. Upon reception of said resource request message, the base station may determine the more appropriate timing for releasing the transmission resources of D2D discovery announcements. A schematic drawing of the resource allocation within a discovery resource period in shown in FIG. 16.

In addition or alternatively, the deciding section may be adapted to read the received resource request message and based thereon decide whether resources for discovery transmission are to be allocated according to a type 1 or according to a type 2 procedure. Further, the deciding section may be adapted to read an identification value included in the D2D MAC CE identifying whether the transmission is discovery transmission or data transmission. Based on the identification value, the deciding section may be adapted to decide whether to allocate resources for discovery transmission or for data transmission on a direct link.

According to an exemplary embodiment of the invention, a transmitting user equipment is given for transmitting data to a receiving user equipment over a direct link connection in a communication system. The transmitting user equipment is adapted to request resources for discovery transmission in the communication system and comprises a generating unit configured to generate a resource request message for allocation of resources for discovery transmission. The resource request message includes information on the amount of data to be transmitted and on discovery indication. The transmitting user equipment may further include a transmitting unit configured to transmit to a base station the generated resource request message, and a receiving unit adapted to receive from the base station a resource configuration message allocating the requested resources for discovery transmission.

According to a further embodiment, the discovery indication includes at least one of a type of discovery service, a duration of the discovery transmission, a number of discovery transmissions, a preferred resource allocation pattern and a preferred type of discovery transmission procedure.

The resource request message may be a radio resource control message or may be discovery scheduling information transmitted to the base station on an uplink data channel for data transmission.

The discovery scheduling information may be, for example, transmitted within a MAC control element for direct link communication. In addition or alternatively, the MAC control element may comprise an identification value identifying whether the transmission is discovery transmission or data transmission.

According to an exemplary embodiment of the invention, the type of discovery transmission procedure includes a first procedure, wherein the allocation of resources for discovery transmission is independent from the transmitting user equipment.

According to a further exemplary embodiment of the invention, the type of discovery transmission procedure includes a second procedure, wherein the allocation of resources for discovery transmission is specific for the transmitting user equipment.

In the transmitting user equipment the receiving unit may be adapted to receive from the base station an interrupt message for interrupting discovery transmission. The transmitting user equipment may also further include a delaying unit adapted to inhibit transmission of a new resource request message for allocation of resources for discovery transmission to the base station for a predefined time. The interrupt message may include at least one of a de-configuration message for de-configuring the allocated resources for discovery transmission and a release message for releasing a radio resource control connection. Further, information on the predefined time may be included in the received de-configuration message or in the resource configuration message.

In the transmitting user equipment the generating unit may be further adapted to generate status information including a continuation message for requesting the base station to maintain the resources allocated for discovery transmission, or a stop message indicating that the allocated resources for discovery transmission can be de-configured. The transmitting unit may be further adapted to transmit the status information to the base station at predefined time intervals. The status information may be included in a MAC control element, preferably the MAC control element for direct link transmission.

According to a further exemplary embodiment of the invention, a base station is given for use in a direct link communication system. The base station may be adapted to assign resources for discovery transmission in the communication system and may comprise a receiving unit adapted to receive from a transmitting user equipment a resource request message for allocation of resources for discovery transmission. The base station may further include a generating unit adapted to generate, in response to the received resource request message, a resource configuration message allocating the requested resources for discovery transmission, and a transmitting unit adapted to transmit the generated resource configuration message.

In an exemplary embodiment of the invention, the resource configuration message may be a radio resource control message. Alternatively, the resource configuration message may be transmitted on the downlink control channel (PDCCH) for discovery transmission on the uplink data channel.

The base station for use in a direct link communication system may further include a deciding section adapted to read the received resource request message and based thereon decide whether resources for discovery transmission are to be allocated according to a first or to a second procedure.

In an exemplary embodiment of the invention, the grant of resources message may include an identification value identifying whether the grant of resources message allocates resources for discovery transmission or for data transmission.

An exemplary embodiment of the invention describes a communication method for requesting resources for discovery transmission by a transmitting user equipment in a communication system. The method comprises the steps of generating, at a generating unit, a resource request message for allocation of resources for discovery transmission. The resource request message may include information on the amount of data to be transmitted and discovery indication. The method further comprises the steps of transmitting, at a transmitting unit, to a base station the generated resource request message, and receiving, at a receiving unit, from the base station a resource configuration message allocating the requested resources for discovery transmission.

In the communication method, the discovery indication may include at least one of a type of discovery service, a duration of the discovery transmission, a number of discovery transmissions, a resource allocation pattern and a type of discovery transmission procedure.

In the communication method, the resource request message may be a radio resource control message or discovery scheduling information transmitted to the base station on an uplink data channel for data transmission.

According to an exemplary embodiment of the invention, the discovery scheduling information may be transmitted within a MAC control element for direct link communication. The MAC control element may comprise an identification value identifying whether the transmission is discovery transmission or data transmission.

The type of discovery transmission procedure includes a first procedure, wherein the allocation of resources for discovery transmission is independent from the transmitting user equipment. Alternatively, the type of discovery transmission procedure includes a second procedure, wherein the allocation of resources for discovery transmission is specific for the transmitting user equipment.

According to an exemplary embodiment of the invention, the communication method may further comprise the steps of receiving, at the receiving unit, from the base station an interrupt message for interrupting discovery transmission, and inhibiting, at a delaying unit, transmission of a new resource request message for allocation of resources for discovery transmission to the base station for a predefined time.

In the communication method according to an exemplary embodiment of the invention, the interrupt message may include at least one of a de-configuration message for de-configuring the allocated resources for discovery transmission and a release message for releasing a radio resource control connection.

In the communication method according to an exemplary embodiment of the invention, information on the predefined time may be included in the received de-configuration message or in the resource configuration message.

The communication method according to an exemplary embodiment of the invention may further comprise the steps of, at the generating unit, generating status information. The status information may include a continuation message for requesting the base station to maintain the resources allocated for discovery transmission, or a stop message indicating that the allocated resources for discovery transmission can be de-configured. The method further includes the step of transmitting, at the transmitting unit, the status information to the base station at predefined time intervals.

In the communication method according to an exemplary embodiment, the status information may be included in a MAC control element, preferably the MAC control element for direct link transmission.

Hardware and Software Implementation of the Invention

Another aspect of the invention relates to the implementation of the above-described various embodiments and aspects using hardware and software. In this connection the invention provides a user equipment (mobile terminal) and a eNodeB (base station). The user equipment is adapted to perform the methods described herein. Furthermore, the eNodeB comprises means that enable the eNodeB to evaluate the IPMI set quality of respective user equipments from the IPMI set quality information received from the user equipments, and to consider the IPMI set quality of the different user equipments in the scheduling of the different user equipments by its scheduler.

It is further recognized that the various embodiments of the invention may be implemented or performed using computing devices (processors). A computing device or processor may for example be general purpose processors, digital signal processors (DSP), application-specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A communication apparatus for device to device (D2D) communication, the communication apparatus comprising:
   a transmitter, which, in operation, transmits to a base station a request message including a resource request, the resource request indicating a number of discovery messages used for a D2D discovery announcement; and
   a receiver, which, in operation, receives from the base station a resource scheduling message that assigns D2D resources for the D2D discovery announcement in response to the resource request,
   wherein the transmitter, in operation, transmits the D2D discovery announcement using one or more of the assigned D2D resources.

2. The communication apparatus according to claim 1, wherein the transmitter, in operation, transmits a stop message indicating that the communication apparatus no longer requires D2D resources for the D2D discovery announcement.

3. The communication apparatus according to claim 2, wherein the stop message causes the assigned D2D resources to be deconfigured.

4. The communication apparatus according to claim 1, wherein the transmitter, in operation, transmits the request message including the resource request when the communication apparatus is allowed to transmit the D2D discovery announcement.

5. The communication apparatus according to claim 1, wherein the resource request includes information on an amount of data transmitted in the D2D discovery announcement.

6. The communication apparatus according to claim 1, wherein the request message is a radio resource control (RRC) message and further includes information on a type of the discovery messages.

7. The communication apparatus according to claim 1, wherein the D2D resources are a plurality of time or frequency resources.

8. The communication apparatus according to claim 1, wherein the D2D discovery announcement is transmitted from the communication apparatus in order to discover an existence of a receiving communication apparatus.

9. A communication method for device to device (D2D) communication, the communication method comprising:
   transmitting to a base station a request message including a resource request, the resource request indicating a number of discovery messages used for a D2D discovery announcement;
   receiving from the base station a resource scheduling message that assigns D2D resources for the D2D discovery announcement in response to the resource request; and
   transmitting the D2D discovery announcement using one or more of the assigned D2D resources.

10. The communication method according to claim 9, further comprising transmitting a stop message indicating that D2D resources are no longer required for the D2D discovery announcement.

11. The communication method according to claim 10, wherein the stop message causes the assigned D2D resources to be deconfigured.

12. The communication method according to claim 9, wherein the request message including the resource request is transmitted when transmission of the D2D discovery announcement is allowed.

13. The communication method according to claim 9, wherein the resource request includes information on an amount of data transmitted in the D2D discovery announcement.

14. The communication method according to claim 9, wherein the request message is a radio resource control (RRC) message and further includes information on a type of the discovery messages.

15. The communication method according to claim 9, wherein the D2D resources are a plurality of time or frequency resources.

16. The communication method according to claim 9, wherein the D2D discovery announcement is transmitted from a transmitting user equipment in order to discover an existence of a receiving user equipment.

* * * * *